United States Patent
Yoshizawa

(10) Patent No.: US 12,259,458 B2
(45) Date of Patent: Mar. 25, 2025

(54) RADAR DEVICE, PROCESSING DEVICE, AND CALCULATION METHOD

(71) Applicant: SONY GROUP CORPORATION, Tokyo (JP)

(72) Inventor: Atsushi Yoshizawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 549 days.

(21) Appl. No.: 17/597,665

(22) PCT Filed: Mar. 19, 2020

(86) PCT No.: PCT/JP2020/012363
§ 371 (c)(1),
(2) Date: Jan. 17, 2022

(87) PCT Pub. No.: WO2021/014686
PCT Pub. Date: Jan. 28, 2021

(65) Prior Publication Data
US 2022/0276369 A1    Sep. 1, 2022

(30) Foreign Application Priority Data

Jul. 24, 2019   (JP) .................................. 2019-136321

(51) Int. Cl.
| G01S 13/46 | (2006.01) |
| G01S 13/87 | (2006.01) |
| G01S 13/931 | (2020.01) |

(52) U.S. Cl.
CPC ............ *G01S 13/46* (2013.01); *G01S 13/878* (2013.01); *G01S 13/931* (2013.01); *G01S 2013/466* (2013.01); *G01S 2013/468* (2013.01)

(58) Field of Classification Search
CPC ...... G01S 13/46; G01S 13/878; G01S 13/931; G01S 2013/466; G01S 2013/468
(Continued)

(56) References Cited

U.S. PATENT DOCUMENTS 4,943,811 A * 7/1990 Alden ................. H01Q 25/001
                                                    343/810
7,009,912 B1 * 3/2006 Haley .................. G01S 3/8083
                                                    342/21
(Continued)

FOREIGN PATENT DOCUMENTS

| CN | 103323810 A | 9/2013 |
| CN | 106019213 A | 10/2016 |

(Continued)

OTHER PUBLICATIONS

International Search Report and Written Opinion of PCT Application No. PCT/JP2020/012363, issued on Jun. 16, 2020, 11 pages of ISRWO.

(Continued)

*Primary Examiner* — Nuzhat Pervin
(74) *Attorney, Agent, or Firm* — CHIP LAW GROUP

(57) ABSTRACT

A radar device includes: a first antenna array including a plurality of antennas arranged on a first straight line; a second antenna array including a plurality of antennas arranged on a second straight line orthogonal to the first straight line; and a calculation unit that calculates a two-dimensional incoming orientation of one or a plurality of incoming waves based on received values of signals received by the plurality of antennas included in the first antenna array and received values of signals received by the plurality of antennas included in the second antenna array. A closest distance among distances between the plurality of antennas included in the first antenna array and the plurality of antennas included in the second antenna array is larger than an antenna interval of the first antenna array or the second antenna array.

19 Claims, 14 Drawing Sheets

(58) Field of Classification Search
USPC .......................................................... 342/59
See application file for complete search history.

(56) References Cited

U.S. PATENT DOCUMENTS

| | | | | |
|---|---|---|---|---|
| 7,474,252 B2* | 1/2009 | Natsume | ................ | G01S 13/34 |
| | | | | 342/70 |
| 9,562,968 B2* | 2/2017 | Wu | ................ | G01S 3/74 |
| 9,618,616 B2* | 4/2017 | Kishigami | ................ | G01S 7/40 |
| 9,869,762 B1* | 1/2018 | Alland | ................ | H01Q 21/08 |
| 10,048,366 B1* | 8/2018 | Hong | ................ | G01S 13/723 |
| 10,145,936 B2* | 12/2018 | Kishigami | ................ | G01S 7/282 |
| 10,359,512 B1* | 7/2019 | Hong | ................ | G01S 13/878 |
| 10,386,462 B1* | 8/2019 | Hong | ................ | G01S 13/46 |
| 10,509,119 B2* | 12/2019 | Hong | ................ | G01S 13/003 |
| 10,564,277 B2* | 2/2020 | Hong | ................ | G01S 13/003 |
| 10,595,209 B2* | 3/2020 | Farshchian | ................ | G01S 7/023 |
| 11,105,910 B2* | 8/2021 | Hong | ................ | G01S 13/003 |
| 11,187,782 B2* | 11/2021 | Bialer | ................ | G01S 7/282 |
| 11,243,304 B2* | 2/2022 | Hong | ................ | G01S 13/003 |
| 11,340,332 B2* | 5/2022 | Cho | ................ | G01S 13/60 |
| 11,448,725 B2* | 9/2022 | Iwasa | ................ | G01S 7/4008 |
| 11,506,775 B2* | 11/2022 | Holt | ................ | H01Q 1/525 |
| 11,619,706 B2* | 4/2023 | Iwasa | ................ | G01S 7/2813 |
| | | | | 342/371 |
| 11,635,506 B2* | 4/2023 | Iwasa | ................ | G01S 7/285 |
| | | | | 342/70 |
| 12,078,745 B2* | 9/2024 | Kishigami | ................ | G01S 7/032 |
| 2006/0007036 A1* | 1/2006 | Natsume | ................ | G01S 3/74 |
| | | | | 342/107 |
| 2016/0327370 A1* | 11/2016 | Holder | ................ | G01S 13/003 |
| 2017/0356786 A1* | 12/2017 | Kleman | ................ | G01F 25/20 |
| 2018/0024235 A1* | 1/2018 | Hong | ................ | G01S 13/87 |
| | | | | 342/59 |
| 2018/0031690 A1* | 2/2018 | Schuman | ................ | G01S 7/288 |
| 2019/0137616 A1* | 5/2019 | Kishigami | ................ | G01S 13/48 |
| 2019/0178985 A1* | 6/2019 | Roh | ................ | G01S 13/56 |
| 2019/0317177 A1* | 10/2019 | Ertan | ................ | G01S 3/46 |
| 2019/0391230 A1* | 12/2019 | Loesch | ................ | G01S 13/42 |
| 2020/0028247 A1* | 1/2020 | Shapoury | ................ | H01Q 3/30 |
| 2020/0266527 A1* | 8/2020 | Cordone | ................ | H01Q 3/26 |
| 2020/0371224 A1* | 11/2020 | Bialer | ................ | G01S 13/58 |
| 2021/0025969 A1* | 1/2021 | Ouchi | ................ | G01S 13/931 |
| 2021/0055404 A1* | 2/2021 | Schoor | ................ | G01S 13/931 |
| 2021/0111479 A1* | 4/2021 | Spalink | ................ | G01S 13/89 |
| 2021/0156986 A1* | 5/2021 | Shee | ................ | H01Q 1/273 |
| 2022/0075023 A1* | 3/2022 | Iwasa | ................ | H01Q 3/34 |
| 2022/0163623 A1* | 5/2022 | Kishigami | ................ | G01S 7/032 |

FOREIGN PATENT DOCUMENTS

| | | | | |
|---|---|---|---|---|
| CN | 106569180 A | | 4/2017 | |
| EP | 2662699 A1 | * | 11/2013 | ............ G01S 13/42 |
| EP | 2896971 A1 | * | 7/2015 | ......... G01S 13/9035 |
| EP | 3471210 B1 | * | 8/2020 | ......... G01S 13/003 |
| JP | 2005-331343 A | | 12/2005 | |
| JP | 2017-508948 A | | 3/2017 | |
| JP | 2017096892 A | * | 6/2017 | ............ G01S 3/46 |
| WO | 2018/051288 A1 | | 3/2018 | |
| WO | 2019/151979 A1 | | 8/2019 | |

OTHER PUBLICATIONS

Toshihiro Sezai, "Direction of Arrival and Magnitude Estimation by the Prony Method with Consideration of Damping Factor", Proceedings of the 2016 IEICE General Conference, Mar. 1, 2016, p. 192.

Zoltowski, et al., "Closed-form 2-D angle estimation with rectangular arrays in element space or beamspace via unitary Esprit", IEEE Transactions on Signal Processing, vol. 44, No. 2, Feb. 1996, pp. 316-328.

Tayem, et al., "L-shape 2-dimensional arrival angle estimation with propagator method", IEEE Transactions on Antennas and Propagation, vol. 53, No. 5, May 2005, pp. 1622-1630.

* cited by examiner

RADAR DEVICE, PROCESSING DEVICE, AND CALCULATION METHOD

CROSS REFERENCE TO RELATED APPLICATIONS

This application is a U.S. National Phase of International Patent Application No. PCT/JP2020/012363 filed on Mar. 19, 2020, which claims priority benefit of Japanese Patent Application No. JP 2019-136321 filed in the Japan Patent Office on Jul. 24, 2019. Each of the above-referenced applications is hereby incorporated herein by reference in its entirety.

FIELD

The present disclosure relates to a radar device, a processing device, a calculation method, and a calculation program.

BACKGROUND

Various types of radars are known. For example, a radar including a plurality of regularly arranged antenna elements such as an array antenna and a radar using an incoming wave estimation method such as the Capon method are known.

CITATION LIST

Patent Literature

Patent Literature 1: Japanese translation of PCT International Application Publication No. 2017-508948

Non Patent Literature

Non Patent Literature 1: "Closed-Form 2-D Angle Estimation with Rectangular Arrays in Element Space or Beamspace via Unitary ESPRIT," IEEE Transaction on Signal Processing, vol 44, no. 2, February 1996.
Non Patent Literature: 2:"L-shape 2-Dimensional Arrival Angle Estimation with Propagator Method," IEEE Transactions on antennas and propagation, vol. 53, no. 5, May 2005.

SUMMARY

Technical Problem

In recent years, with the spread of applications of radars, there is an increasing demand for radar performance (for example, hardware performance such as small size, light weight, and low power consumption, basic performance such as resolution, and the like). However, a conventional radar (for example, a radar using a conventional array arrangement or a radar using a conventional incoming wave estimation method) does not necessarily achieve radar performance high enough to satisfy these requirements.

Therefore, the present disclosure proposes a radar device, a processing device, a calculation method, and a calculation program capable of achieving high radar performance.

Solution to Problem

To solve the above problem, a radar device according to the present disclosure includes: a first antenna array including a plurality of antennas arranged on a first straight line; a second antenna array including a plurality of antennas arranged on a second straight line orthogonal to the first straight line; and a calculation unit that calculates a two-dimensional incoming orientation of one or a plurality of incoming waves based on received values of signals received by the plurality of antennas included in the first antenna array and received values of signals received by the plurality of antennas included in the second antenna array. A closest distance among distances between the plurality of antennas included in the first antenna array and the plurality of antennas included in the second antenna array is larger than an antenna interval of the first antenna array or the second antenna array.

DESCRIPTION OF EMBODIMENTS

Figure 1:
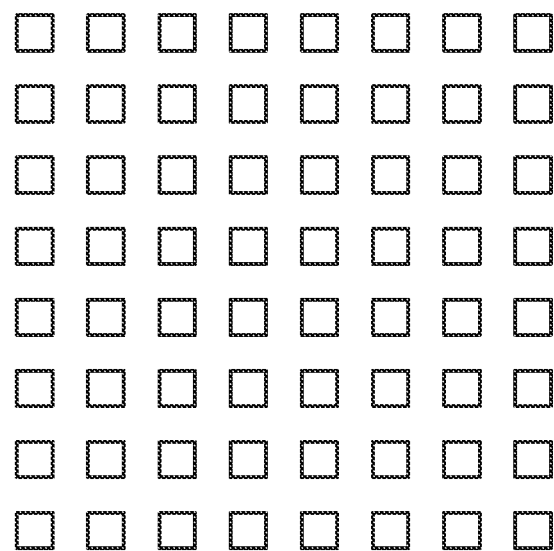
FIG. 1 is a diagram illustrating an example (rectangular arrangement) of an antenna arrangement of a conventional two-dimensional array.

Hereinafter, embodiments of the present disclosure will be described in detail with reference to the drawings. In each of the embodiments below, the same parts are designated by the same reference numerals, so that duplicate description will be omitted.

The present disclosure will be described according to the order of items shown below.

1. Introduction
   1-1. Purpose and the like of present embodiment
   1-2. Problems of conventional orientation estimation method
   1-3. Outline of present embodiment
2. Configuration of radar device
   2-1. Configuration example of radar device
   2-2. Specific configuration example of radar device
3. Incoming wave estimation method of present embodiment
   3-1. Description of incoming wave estimation method
   3-2. Difference from conventional technology
   3-3. Array arrangement example
   3-4. Pairing
   3-5. Modification of array arrangement
4. Operation of radar device
5. Verification of resolution performance of incoming wave
6. Modification
7. Conclusion

1. INTRODUCTION

<1-1. Purpose and the Like of Present Embodiment>

In recent years, with the spread of applications of radars, there is an increasing demand for radar hardware performance such as small size, light weight, and low power consumption. With increasing importance of a radar as a sensor, further improvement in basic performance (resolution performance and the like) of a radar is also required.

In general, in a small radar, it is not allowed to have many RF/antenna circuits due to power constraints, and it is not realistic to obtain a large antenna aperture length due to space constraints, so that it is difficult to have high target resolution performance. Therefore, basically, small size and high resolution performance are conflicting requirements. However, attempts have been made to achieve a high-performance radar even with a small size by combining advanced signal processing and an appropriate antenna configuration. These include, for example, virtual MIMO processing, Khatri-Rao product expansion processing of unequally spaced antennas, super-resolution algorithms, and the like.

However, merely applying these methods to the conventional antenna device does not necessarily achieve radar performance high enough to satisfy the demand.

Therefore, in view of such a trend, the present embodiment provides an efficient incoming wave direction estimation method that contributes to small size, light weight, or low power consumption of a radar. For example, in the present embodiment, a two-dimensional orientation estimation method capable of solving the problems of two-dimensional processing of a conventional super-resolution algorithm is applied. By applying the orientation estimation method of the present embodiment to a radar device, it is possible to achieve improvement of target resolution performance and the like.

In the present embodiment, a hardware configuration (for example, arrangement of antenna elements) of a radar device capable of achieving high radar performance will also be described.

<1-2. Problems of Conventional Orientation Estimation Method>

In general, in order to perform two-dimensional orientation estimation, arrays are arranged two-dimensionally, and a phase difference of a received signal of each antenna is detected. However, when the arrays are arranged two-dimensionally, a new problem that does not exist in the one-dimensional array occurs.

First, there is a difficulty in antenna mounting caused by two-dimensionally arranging arrays. In particular, in the case of implementing a radar in the millimeter wave band, the characteristics of the power supply circuit to the antenna have extremely high pattern dependency, and there is a high possibility that a two-dimensional layout will cause a large restriction in design.

Second, there is an increase in power consumption due to the use of many antennas. For example, in a one-dimensional case, an array having N columns of antennas only in the horizontal direction is sufficient, but in a two-dimensional case, it is necessary to further include an array of M rows in the vertical direction. At this time, for example, when the antenna elements are laid in a rectangular shape of M rows and N columns, M×N antenna elements are arranged in total. However, when power is supplied to each of such many antenna elements by an RF circuit, the power consumption may exceed a value allowed in terms of specifications. It goes without saying that a circuit board including such a large number of millimeter wave RF circuits may be extremely expensive, and there is a concern that it is not acceptable in terms of cost.

In order to avoid such use of M×N antenna elements, virtual multiple-input and multiple-output (MIMO) processing is known. For example, in this case, M rows of transmission antenna elements are arranged vertically, and reception antenna elements are arranged horizontally. As a result, M×N received signals are equivalently obtained at the reception end. However, in this case, it is necessary to arrange M transmitters, and an increase in power consumption due to this is inevitable. In general, the power consumption of the transmission circuit is extremely large, and there is a high possibility that such a configuration is not acceptable in a small radar. In a transmission antenna, a relatively large antenna pattern using multiple elements is often used in order to gain a large gain. In such a case, it may not be allowed to arrange M transmission antennas.

Third, performing radar signal processing on such received signals in the M×N antenna elements may lead to an increase in signal processing amount and may be extremely inefficient. Problems in converting a one-dimensional radar into a two-dimensional radar will be sequentially described below using various incoming wave orientation estimation algorithms as examples, from the viewpoint of signal processing.

In the most basic form of conventional orientation estimation of an incoming wave by an antenna array, phase information is extracted by fast Fourier transform (FFT) processing of each received signal of the incoming wave received by the array, and a peak portion when the phase information is expressed as a spectrum is used as an estimated value of an incoming wave direction. However, this method usually has a problem that angular separation performance of incoming waves is extremely poor. In particular, this problem becomes remarkable when the number of antennas of the array is small, and it is difficult to perform high-resolution orientation estimation in a small radar.

In addition to this problem, the FFT processing requires additional processing of scanning the obtained orientation spectrum and searching for a peak point. Even in the case of one-dimensional orientation estimation, an increase in the amount of operation and an increase in processing delay due to the one-dimensional orientation estimation are not preferable in practical use. However, in the case of two-dimensional orientation estimation, a space to be searched is remarkably increased, and thus the problem becomes more serious.

Such necessity of the peak search is a common problem in the incoming wave direction estimation method through the orientation spectrum. Therefore, a similar problem is inherent in the Capon method and the multiple signal classification (Music) method.

The Capon method and the Music method are so-called "high-resolution algorithms", and the separation performance of the incoming wave, which has been a problem in the FFT processing, is improved. However, also in these algorithms, an increase in operation due to scanning of a two-dimensional orientation spectrum and a delay due to the increase in operation may be a big problem.

In addition, the Capon method and the Music method always have a problem that the substantial aperture length is necessarily smaller than the aperture length of the original array. This is because, in practice, it is assumed that there is a large correlation between incoming waves of radar, and thus, in order to correctly use these algorithms, pre-processing called spatial averaging is required to reduce the aperture length of the array. Such side effects due to the spatial averaging method may be unacceptable, especially when the array size is small, such as one of a small radar.

For the above reasons, the FFT method, the Capon method, and the Music method are not suitable as an orientation estimation algorithm of a two-dimensional array of small radars.

As an efficient method of achieving the two-dimensional array, a method of arranging two one-dimensional arrays in the horizontal direction and the vertical direction is conceivable. By the method, the redundancy in the rectangular arrangement can be significantly reduced. For example, when N columns of one-dimensional arrays are arranged in the horizontal direction and the vertical direction, a two-dimensional array can be configured by 2N antenna elements at most.

Here, such a two-dimensional array is assumed, and individual incoming angle estimation is applied to each one-dimensional array. At this time, if there are a plurality of incoming waves, a plurality of incoming waves is estimated in each array, but in order to determine the angles of the two incoming waves, the correspondence relationship between the incoming waves of the two estimation results needs to be determined.

Such processing related to the association between the incoming wave estimation result of the horizontal array and the incoming wave estimation result of the vertical array in the two-dimensional orientation estimation is called pairing.

As an orientation estimation method capable of efficiently performing pairing, an Estimation of Signal Parameters via Rotational Invariance Techniques (Esprit) method is known. Therefore, the Esprit method is known as an algorithm suitable for two-dimensional orientation estimation. The Esprit method calculates the estimation result of the incoming wave not as an orientation spectrum but as a numerical value.

The Esprit method calculates the "rotation-invariant matrix" of the signal between two sub-arrays defined in the original array and uses its eigenvalues for the incoming wave estimation result. At this time, since eigenvectors of the rotation-invariant matrix match with incoming waves in the horizontal and vertical directions, pairing of flat and vertical incoming waves is achieved.

However, in general, the Esprit method has a problem that a calculation amount is large. For example, in order to perform the incoming wave estimation by the Esprit method, it is necessary to perform eigenvalue decomposition of the matrix at least twice or more. For example, among the Esprit methods, the Total Least Squares Esprit (TLS-Esprit) method, which is a typical implementation method considered to have high accuracy, requires eigenvalue decomposition as many as three times. In general, eigenvalue decomposition of a matrix by numerical calculation needs to be performed until an iterative operation is converged, and a load is often large in radar signal processing for which real-time property is required.

As a method for alleviating such a problem of the calculation amount of the Esprit method, Non-Patent Literature 1 ("Closed-Form 2-D Angle Estimation with Rectangular Arrays in Element Space or Beamspace via Unitary ESPRIT," IEEE Transaction on Signal Processing, vol 44, no. 2, February 1996) discloses a method of achieving a lighter Esprit method called the Unitary Esprit method. For example, Non Patent Literature 1 discloses a method for achieving a more efficient two-dimensional orientation estimation method by converting an eigenvector appearing by the Esprit method into a real number.

However, in the Unitary Esprit method, it is necessary to make the shape of the array of the radar centrosymmetric, and in the two-dimensional orientation estimation, there is a problem that the shape of the array is limited to a two-dimensional centrosymmetric figure such as a rectangle or a cross.

Figure 2:
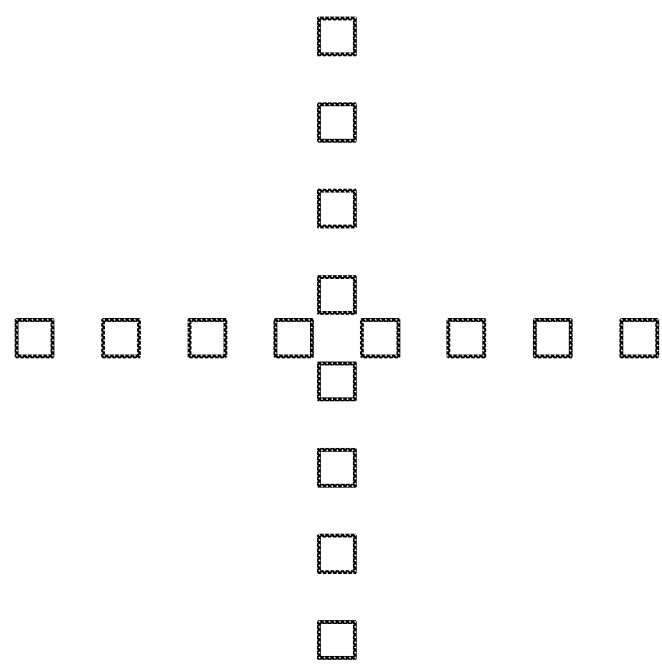
FIG. 2 is a diagram illustrating an example (cross arrangement) of an antenna arrangement of a conventional two-dimensional array.
Figure 3:
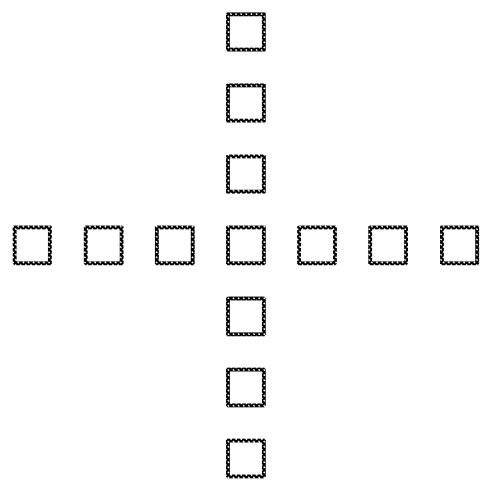
FIG. 3 is a diagram illustrating an example (cross arrangement) of an antenna arrangement of a conventional two-dimensional array.

FIGS. 1, 2, and 3 illustrate a typical example of a layout of a planar array antenna allowed by the Unitary Esprit method. FIG. 1 illustrates a most basic two-dimensional array configuration in which 8 elements and 64 elements in total are arranged in a rectangular shape on one horizontal and vertical sides. In this case, the number of antennas is as large as 64, which is considered to be the most robust implementation, but there is a problem that the implementation cost as a radar is extremely large in practice.

On the other hand, FIGS. 2 and 3 illustrate a case where the arrays are arranged in a cross shape. In the example of FIG. 2, the number of horizontal and vertical arrays is eight, and in the example of FIG. 3, the number is seven. With such a cross arrangement, it is possible to greatly reduce the redundancy in mounting. However, in a case where the number of elements on one side is an even number as illustrated in FIG. 2, since the antennas near the center are extremely close to each other, there arises a problem that it is not easy to mount a power supply circuit to the antennas due to the side effects from coupling between the antennas.

As illustrated in FIG. 3, when the number of elements on one side is set to an odd number, the center antenna element is shared horizontally and vertically. In this case, this central element operates as part of either a horizontal or vertical array due to the circuit configuration. Therefore, in this case, it is difficult to maintain the two-dimensional center symmetry of the array from the viewpoint of electrical characteristics including the entire RF circuit such as the power supply circuit.

Therefore, in these conventional array realization methods, it must be said that there is still a problem that design flexibility in an array radar or RF performance of an array is deteriorated.

In order to avoid such a constraint that a centrosymmetric array needs to be used, an incoming wave estimation method other than the Unitary Esprit method is considered. For example, Non Patent Literature 2 ("L-shape 2-Dimensional Arrival Angle Estimation with Propagator Method," IEEE Transactions on antennas and propagation, vol. 53, no. 5, May 2005) discusses an L-shaped array configuration.

Figure 4:
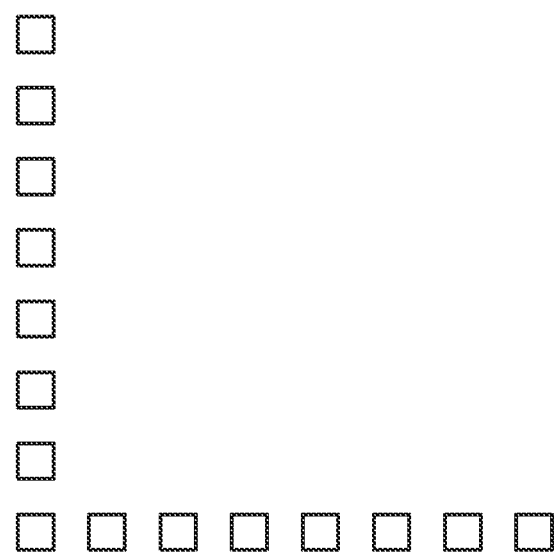
FIG. 4 is a diagram illustrating an example (L-shaped arrangement) of an antenna arrangement of a conventional two-dimensional array.

FIG. 4 is a diagram illustrating an example (L-shaped arrangement) of an antenna arrangement of a conventional two-dimensional array. More specifically, FIG. 4 is an L-shaped array disclosed in Non Patent Literature 2. FIG. 4 illustrates an example of an L-shaped array having eight elements on one side.

Since the Unitary Esprit method cannot be applied to such a non-centrosymmetric array, it is necessary to use the normal Esprit method. However, as described above, the normal Esprit method is not desirable because the calculation amount is large. Therefore, Non Patent Literature 2 attempts to apply an incoming wave estimation method called a Propagator method, which is considered to have a smaller calculation amount than that of the Esprit method.

However, the Propagator method has a problem that a correct incoming wave estimation result cannot be obtained unless the number of incoming waves is accurately known in advance due to the principle of the algorithm. Several methods are known for estimating the number of incoming waves, for example, the Akaike information criterion method (AIC method). However, in reality, the profile of the incoming wave in the real environment is very complicated, and it is not easy to accurately calculate the number of incoming waves by a specific algorithm. Therefore, the Propagator method is not a desirable method for achieving the object.

This processing of "accurately estimating the number of incoming waves in advance" is a problem common to so-called subspace type algorithms. Therefore, it is actually a problem that also applies to the Esprit method and the Music method described above. For this reason, neither the Esprit method nor the Music method is a desirable method for achieving the object.

As similar to the Music method, the Esprit method also causes a problem of reduction of the antenna aperture length by the spatial averaging method.

For these reasons, it is assumed that the Esprit method, the Propagator method, or the like is not suitable as an incoming wave estimation method for achieving a desired small radar.

As described above, in order to perform stable incoming wave detection, a novel incoming wave estimation algorithm is required regardless of the presence or absence of knowledge of the number of incoming waves and regardless of the presence or absence of correlation between incoming waves. It is assumed that, in this novel incoming wave estimation method, things are desired. For example, it is desirable that the novel incoming wave estimation method enables flexible two-dimensional array arrangement suitable for small radars and facilitates pairing. Furthermore, the novel incoming wave estimation method is desired to have a small operation amount.

<1-3. Outline of Present Embodiment>

In view of such a situation, the present embodiment discloses a novel incoming wave estimation method (signal processing method) suitable for a small radar. In this novel incoming wave estimation method, second-order incoming wave estimation is enabled, flexible array arrangement is allowed, and high horizontal and vertical resolutions are achieved. The present embodiment also discloses a radar device that performs the novel incoming wave estimation method.

By using the incoming wave estimation method of the present embodiment, the radar device can directly perform the pairing of the incoming waves detected by the horizontal and vertical arrays by the signal values of the incoming waves calculated from the arrays. Therefore, the antenna device of the present embodiment using the incoming wave estimation method of the present embodiment can easily perform pairing in two arrays arranged at an equal interval and existing apart from each other at any position on a plane in principle.

Therefore, the antenna device of the present embodiment does not need to perform peak detection of the orientation spectrum as in the FFT method, the Capon method, and the Music method, and thus does not cause various problems associated therewith.

The antenna device according to the present embodiment eliminates the need to perform eigenvalue decomposition in the method for estimating an incoming wave as in the Esprit method, and thus can achieve high-speed processing.

The incoming wave estimation method of the present embodiment does not require accurate information on the number of incoming waves, which is essential for the Esprit method, the Music method, and the Propagator method. Therefore, the antenna device of the present embodiment can eliminate the practical problem of the conventional high-resolution incoming estimation method.

In addition, since the incoming wave estimation method of the present embodiment operates regardless of the presence or absence of correlation between incoming waves, even if the antenna device of the present embodiment is a small radar, the problem of reducing the antenna aperture length by spatial averaging does not occur.

In addition, the incoming wave estimation method according to the present embodiment can provide significantly improved incoming wave decomposition performance that cannot be achieved with low incoming wave decomposition performance as in the FFT method.

From these preferable features, the method of the present embodiment can achieve significant improvement in the achievement of a compact radar.

The outline of the present embodiment has been described above, and the radar device of the present embodiment will be described in detail below.

2. CONFIGURATION OF RADAR DEVICE

First, a configuration of a radar device will be described. Here, a configuration of a radar device 10 which is an example of the radar device of the present embodiment will be described.

The radar device 10 is a radar capable of detecting a direction or the like in which one or more objects are located. For example, the radar device 10 is an FMCW radar that transmits a chirp signal as a transmission signal and detects a distance, a direction, or a speed to one or more objects on the basis of a signal reflected from the one or more objects. Of course, the radar device 10 is not limited to the FMCW radar.

The concept of radar device includes not only a structure having a radar function but also a device installed in a structure. The structure is, for example, a building such as an airport facility, a harbor facility, a station facility, a steel tower, an office building, a house, or a stadium. The concept of the structure includes not only buildings but also non-building structures such as an iron pole, a tunnel, a bridge, a dam, and a fence, and facilities such as a crane, a gate, and a windmill. The concept of the structure includes not only a structure on land (on the ground in a narrow sense) or in the ground, but also a structure on water such as a platform or a megafloat, and a structure under water such as a marine observation facility.

The radar device 10 may be a radar fixed to a structure such as an airport surveillance radar, or may be a movable radar such as a ship-based radar. When the radar device 10 is a movable radar, the radar device 10 may be a device installed in a moving body or may be a moving body itself. For example, a device that is originally capable of moving, such as a vehicle, a drone, or a smartphone, and has a radar function corresponds to the radar device 10 as a moving body.

Here, the moving object may be a mobile terminal such as a smartphone or a mobile phone. The moving body may be a moving body (for example, a vehicle such as an automobile, a bicycle, a bus, a truck, a motorcycle, a train, or a linear motor car) that moves on land (on the ground in a narrow sense) or a moving body (for example, a subway train) that moves in the ground (for example, in a tunnel).

The moving body may be a moving body (for example, a ship such as a passenger ship, a cargo ship, or a hovercraft) that moves over water or a moving body (for example, a submersible such as a submersible vessel, a submarine, and an unmanned submersible) that moves under water.

The moving body may be a moving body (for example, an aircraft such as an airplane, an airship, or a drone) that moves inside the atmosphere or a moving body (for example, an artificial body such as an artificial satellite, a spacecraft, a space station, and a probe) that moves outside the atmosphere. A moving object moving outside the atmosphere can be rephrased as a space moving object.

The radar device 10 may be a radar device (hereinafter, referred to as a ground radar device) located on the ground. For example, the radar device 10 may be a radar device arranged on a structure on the ground, or may be a radar device installed on a moving body moving on the ground. Of course, the radar device 10 may be a structure or a moving body itself. The "ground" is a ground in a broad sense including not only land (ground in a narrow sense) but under the ground, on the water, and under the water.

The radar device 10 is not limited to a ground radar device. The radar device 10 may be a radar device (hereinafter, referred to as a non-ground radar device) capable of floating in the air or space. For example, the radar device 10 may be a radar device (hereinafter, referred to as an aircraft radar device) arranged on an aircraft or a radar device (hereinafter, referred to as a satellite radar device) arranged on a satellite.

An aircraft radar device is a radar device that can float in the atmosphere, such as an aircraft. The aircraft radar device may be a device mounted on an aircraft or the like, or may be an aircraft itself. The concept of an aircraft includes not only heavy aircraft such as an airplane and a glider but also light aircraft such as a balloon and an airship. The concept of an aircraft includes not only a heavy aircraft and a light aircraft but also a rotorcraft such as a helicopter and an autogyroscope. The aircraft station device (alternatively, an aircraft on which an aircraft station device is mounted) may be an unmanned aerial vehicle such as a drone.

The concept of the unmanned aerial vehicle also includes an unmanned aircraft system (UAS) and a tethered UAS. The concept of unmanned aerial vehicle also includes Lighter than Air UAS (LTA) and Heavier than Air UAS (HTA). In addition, the concept of unmanned aerial vehicle also include High Altitude UAS Platforms (HAPs).

A satellite radar device is a radar device that can float outside the atmosphere. The satellite radar device may be a device mounted on a space vehicle such as an artificial satellite, or may be a space vehicle itself. A satellite to be a satellite radar device (alternatively, a satellite on which a radar device is mounted) may be any of a low earth orbiting (LEO) satellite, a medium earth orbiting (MEO) satellite, a geostationary earth orbiting (GEO) satellite, and a highly elliptical orbiting (HEO) satellite. Of course, the satellite radar device may be a device mounted on a low earth orbiting satellite, a middle earth orbiting satellite, a geostationary earth orbiting satellite, or a high elliptical orbiting satellite.

The radar device 10 may be a small device that detects an inter-vehicle distance between automobiles, or a large device that detects a position of an aircraft several hundred kilometers away.

The radar device 10 may be installed and/or operated by one company, or may be installed and/or operated by one individual. Of course, the installation and operation entity of the radar device 10 is not limited thereto. For example, the radar device 10 may be installed and operated jointly by a plurality of businesses or a plurality of individuals. The radar device 10 may be shared equipment used by a plurality of businesses or a plurality of individuals. In this case, installation and/or operation of the equipment may be performed by a third party different from the user.

<2-1. Configuration Example of Radar Device>

The radar device 10 of the present embodiment includes two array antennas arranged horizontally and vertically as reception antennas. The radar device 10 acquires received values of signals received by these two array antennas.

Then, the radar device 10 calculates the signal value of the incoming wave from the received value using the incoming wave estimation method of the present embodiment. The incoming wave estimation method of the present embodiment does not require an accurate value of the number of incoming waves in each of the horizontal direction and the vertical direction, and can obtain preferable estimation performance even in the case of a correlated incoming wave. The radar device 10 performs pairing of incoming waves between the horizontal and vertical arrays by collating incoming wave signal values in the horizontal direction with incoming wave signal values in the vertical direction.

At this time, the signal value of the incoming wave can be reconfigured at an arbitrary position. Therefore, the positions of the horizontal and vertical arrays included in the radar device 10 can be set to arbitrary positions. This significantly improves the horizontal and vertical array layout flexibility of 2D orientation estimation.

Figure 5:
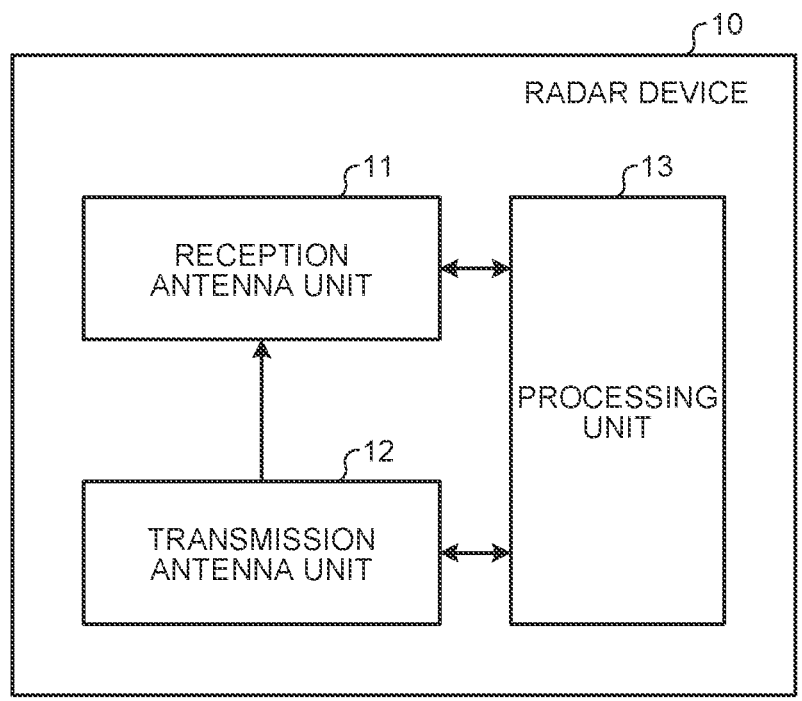
FIG. 5 is a diagram illustrating a configuration example of a radar device according to an embodiment of the present disclosure.

FIG. 5 is a diagram illustrating a configuration example of the radar device 10 according to an embodiment of the present disclosure. The radar device 10 includes a reception antenna unit 11, a transmission antenna unit 12, and a processing unit 13. The configuration illustrated in FIG. 5 is a functional configuration, and the hardware configuration may be different from the functional configuration. The functions of the radar device 10 may be implemented in a distributed manner in a plurality of physically separated configurations.

The reception antenna unit 11 is an antenna unit that receives a reflected signal of a signal transmitted from the transmission antenna unit 12. The reception antenna unit 11 includes two array antennas arranged horizontally and vertically as reception antennas. Each of the two array antennas is a linear array in which a plurality of antennas (antenna elements) are linearly arranged. The reception antenna unit 11 transmits a signal value (hereinafter, referred to as a received value) of the received signal to the processing unit 13.

The transmission antenna unit 12 is an antenna unit that transmits a predetermined radio frequency (RF) signal. For example, the transmission antenna unit 12 is an antenna unit that transmits a chirp signal as a transmission signal. The radio wave used by the transmission antenna unit 12 for signal transmission is, for example, a millimeter wave (extra high frequency (EHF)). Of course, the radio wave used by the transmission antenna unit 12 to transmit a signal is not limited to the millimeter wave, and may be, for example, a microwave (super high frequency (SHF)) or an ultra high frequency (UHF).

The processing unit 13 is a device that performs various processes. The processing unit 13 may be a controller that controls each unit of the radar device 10. The processing unit 13 is achieved by, for example, a processor such as a signal processor, a central processing unit (CPU), or a micro processing unit (MPU). For example, the processing unit 13 is achieved by the processor executing various programs stored in a storage device inside the radar device 10 using a random access memory (RAM) or the like as a work region. The processing unit 13 may be achieved by an integrated circuit such as an application specific integrated circuit (ASIC) or a field programmable gate array (FPGA). Any of the CPU, the MPU, the ASIC, and the FPGA can be regarded as a controller.

Figure 6:
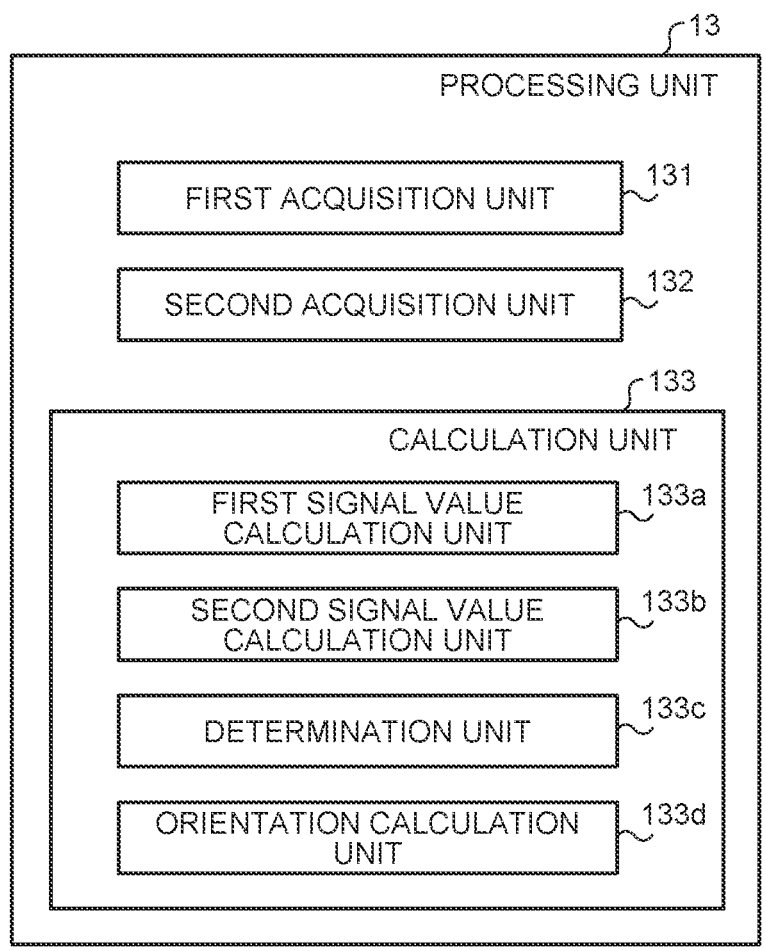
FIG. 6 is a functional block diagram of a processing unit included in the radar device.

FIG. 6 is a functional block diagram of the processing unit 13 included in the radar device 10. The processing unit 13 includes a first acquisition unit 131, a second acquisition unit 132, and a calculation unit 133. The calculation unit 133 includes a first signal value calculation unit 133*a*, a second signal value calculation unit 133*b*, a determination unit 133*c*, and an orientation calculation unit 133*d*. Each block (first acquisition unit 131 to calculation unit 133, and first signal value calculation unit 133*a* to orientation calculation unit 133*d*) constituting the processing unit 13 is a functional block indicating a function of the processing unit 13. These functional blocks may be software blocks or hardware blocks. For example, each of the functional blocks described above may be one software module achieved by software (microprograms), or may be one circuit block on a semiconductor chip (die). Of course, each functional block may be one processor or one integrated circuit. A configuration method of the functional block is arbitrary. Note that the processing unit 13 may be configured by a functional unit different from the above-described functional block.

<2-2. Specific Configuration Example of Radar Device>

Figure 7:
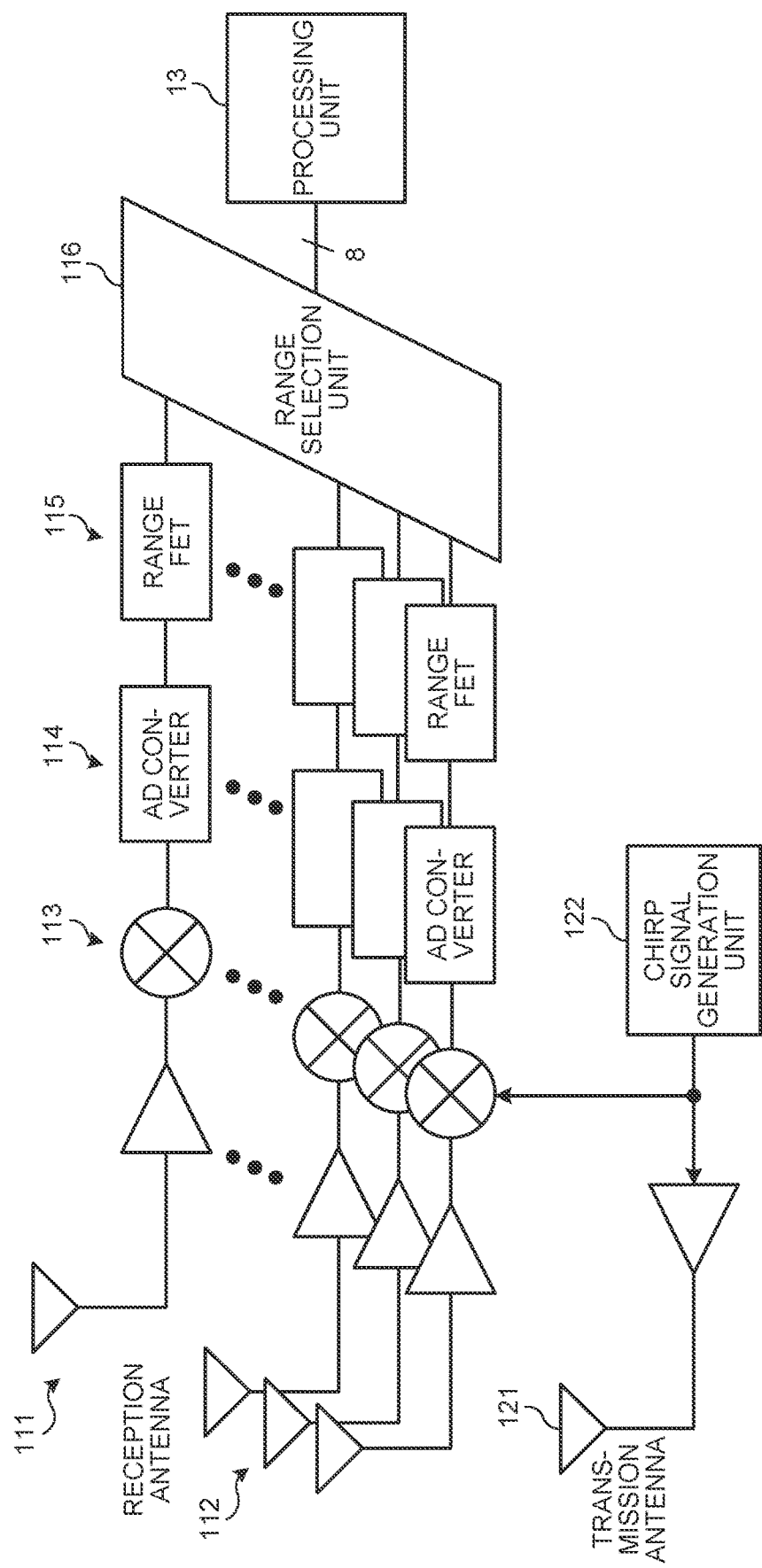
FIG. 7 is a diagram illustrating a specific configuration example of the radar device according to the embodiment of the present disclosure.

FIG. 7 is a diagram illustrating a specific configuration example of the radar device 10 according to the embodiment of the present disclosure. More specifically, FIG. 7 is a diagram illustrating circuit blocks assumed for two array antennas (first array antennas) each including four antennas (antenna elements). The two array antennas illustrated in FIG. 7 are linear antennas in which a plurality of antennas (antenna elements) are linearly arranged.

Figure 8:
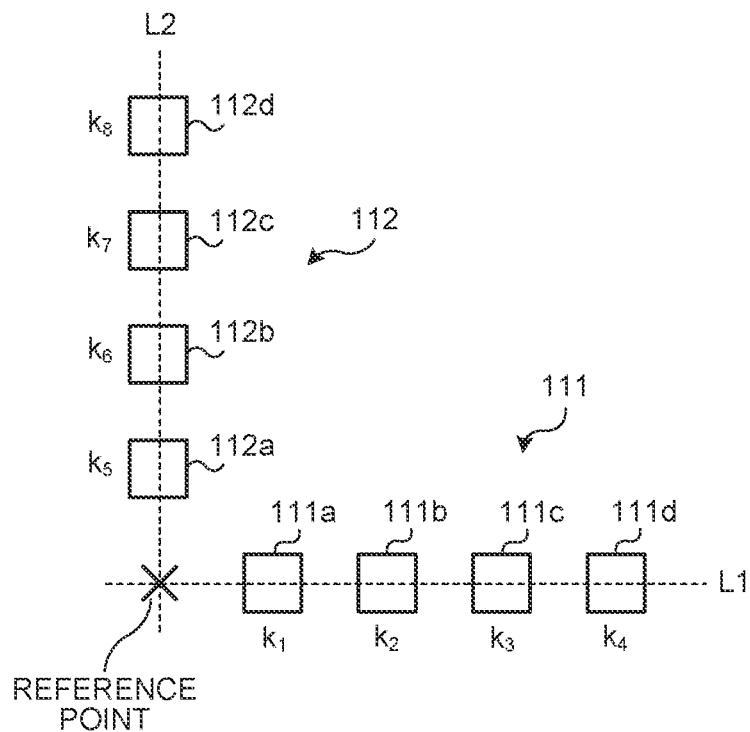
FIG. 8 is a diagram illustrating an example of an array arrangement to which a circuit block illustrated in FIG. 7 can be applied.

FIG. 8 is a diagram illustrating an example of array arrangement to which a circuit block illustrated in FIG. 7 can be applied. The radar device 10 includes, as reception antennas, an antenna array 111 including a plurality of antennas arranged on a straight line L1 (first straight line) and an antenna array 112 including a plurality of antennas arranged on a straight line L2 (second straight line) orthogonal to the straight line L1. In the case of the example of FIG. 8, the antenna array 111 and the antenna array 112 are arranged on a plane so that the antenna array 111 and the antenna array 112 form an L shape.

The antenna array 111 and the antenna array 112 illustrated in FIG. 8 are arrays arranged at an equal interval each including four antennas (antenna elements). In the example of FIG. 8, the antenna array 111 includes an antenna 111*a*, an antenna 111*b*, an antenna 111*c*, and an antenna 111*d*, and the antenna array 112 includes an antenna 112*a*, an antenna 112*b*, an antenna 112*c*, and an antenna 112*d*.

Among the distances between the plurality of antennas included in the antenna array 111 and the plurality of antennas included in the antenna array 112, the closest distance (hereinafter, referred to as a closest distance between the antenna array 111 and the antenna array 112) is longer than the antenna interval between the antenna array 111 and the antenna array 112. In the example of FIG. 8, the closest distance between the antenna array 111 and the antenna array 112 is the distance between the antenna 111*a* and the antenna 112*a*.

The antenna interval of the antenna array 111 and the antenna interval of the antenna array 112 may be the same or different. In a case where the antenna interval of the antenna array 111 is different from the antenna interval of the antenna array 112, the closest distance between the antenna array 111 and the antenna array 112 may be longer than any one of the antenna interval of the antenna array 111 and the antenna interval of the antenna array 112. At this time, the closest distance may be longer than the larger one of the antenna interval of the antenna array 111 and the antenna interval of the antenna array 112. Of course, the closest distance may be longer than the shorter one of the antenna interval of the antenna array 111 and the antenna interval of the antenna array 112. As a result, the antenna array can reduce electromagnetic influence from other antenna arrays.

In the case of the array arrangement illustrated in FIG. 8, horizontal and vertical two-dimensional orientation estimation is possible. In the description below, the extending direction of the straight line L1 (horizontal direction in the drawing) is referred to as a horizontal direction, and the extending direction of the straight line L2 (vertical direction in the drawing) is referred to as a vertical direction. An intersection (that is, the intersection of the straight lines L1 and L2) of a line obtained by extending the antenna array 111 and the antenna array 112 is set as a reference point for convenience.

Here, snapshot values of received signals at a certain time obtained from each of the antennas of the antenna array 111 (horizontal array) are defined as $k_1$, $k_2$, $k_3$, $k_4$. Snapshot values of received signals obtained from each of the antennas of the antenna array 112 (vertical array) are defined as $k_5$, $k_6$, $k_7$, $k_8$. In the description below, these snapshot values may be referred to as received values.

The radar device 10 illustrated in FIG. 7 is assumed to be an FMCW radar as an example. In this case, the radar device 10 illustrated in FIG. 7 includes a chirp signal generation unit 122, and transmits a chirp signal from the transmission antenna 121. The incoming wave reflected by the target is incident on each antenna of the antenna arrays 111, 112 as a plane wave. In the example of FIG. 7, the number of transmission antennas 121 is one, but a plurality of transmission antennas 121 may be provided. The transmission antenna 121 may form virtual MIMO.

In FIG. 7, the received RF signal received by each antenna is subjected to frequency conversion by a mixer circuit 113 using a transmission signal to generate a beat signal. These beat signals are A/D-converted by an AD converter 114 and then discriminated into data by distance by a range FFT 115. A range selection unit 116 extracts data of a predetermined range of interest from the data after the range FFT 115 thus obtained. Therefore, the snapshot values (received values) $k_1$ to $k_8$ actually refer to the eight pieces of digital data output from the range selection unit 116 obtained in this manner.

3. INCOMING WAVE ESTIMATION METHOD OF PRESENT EMBODIMENT

The configuration of the radar device 10 has been described above. Next, an incoming wave estimation method of the present embodiment will be described.

<3-1. Description of Incoming Wave Estimation Method>

Consider a case where there are two incoming waves in the array arrangement illustrated in FIG. 8. The incident angles of these two incoming waves are a zenith angle and an orientation angle, and are $(\theta_1, \phi_1)$ and $(\theta_2, \phi_2)$, respectively. The signal values of these two incoming waves at the reference point in FIG. 8 are $a_1$ and $a_2$ for the horizontal array and $b_1$ and $b_2$ for the vertical array, respectively.

At this time, the signal values $k_1$ to $k_4$ received by the each of the antennas of the horizontal array can be expressed as the following Equations (1) to (4), ignoring noise components.

$$k_1 = a_1 x_1 + a_2 x_2 \tag{1}$$

$$k_2 = a_1 x_1^2 + a_2 x_2^2 \tag{2}$$

$$k_3 = a_1 x_1^3 + a_2 x_2^3 \tag{3}$$

$$k_4 = a_1 x_1^4 + a_2 x_2^4 \tag{4}$$

At this time, $x_1$ and $x_2$ can be expressed as the following Equations (5) and (6).

$$x_1 = \exp\left(-j\frac{2\pi d_x}{\lambda}\sin\theta_1\cos\phi_1\right) \tag{5}$$

$$x_2 = \exp\left(-j\frac{2\pi d_x}{\lambda}\sin\theta_2\cos\phi_2\right) \tag{6}$$

In Equations (5) and (6), $\lambda$ represents a wavelength of an incoming wave, and $d_x$ represents a distance between antennas in the horizontal array.

On the other hand, also in the vertical array, the signal values $k_5$ to $k_8$ received by the each of the antennas can be expressed as the following Equations (7) to (10), ignoring noise components.

$$k_5 = b_1 y_1 + b_2 y_2 \tag{7}$$

$$k_6 = b_1 y_1^2 + b_2 y_2^2 \tag{8}$$

$$k_7 = b_1 y_1^3 + b_2 y_2^3 \tag{9}$$

$$k_8 = b_1 y_1^4 + b_2 y_2^4 \tag{10}$$

At this time, $y_1$ and $y_2$ can be expressed as the following Equations (11) and (12).

$$y_1 = \exp\left(-j\frac{2\pi d_y}{\lambda}\sin\theta_1\sin\phi_1\right) \tag{11}$$

$$y_2 = \exp\left(-j\frac{2\pi d_y}{\lambda}\sin\theta_2\sin\phi_2\right) \tag{12}$$

In Equations (11) and (12), $\lambda$ represents a wavelength of an incoming wave, and $d_y$ represents a distance between antennas in the vertical array.

At this time, when Equations (1) to (4) are regarded as simultaneous equations, the number of variables is four of $a_1$, $a_2$, $x_1$, and $x_2$, but there are also four conditional equations. Therefore, the simultaneous equations can be solved formally, and the four variables $a_1$, $a_2$, $x_1$, and $x_2$ can be expressed as closed-form equations by $k_1$ to $k_4$, respectively.

Similarly, the four variables $b_1$, $b_2$, $y_1$, and $y_2$ can also be expressed as closed-form equations by $k_5$ to $k_8$.

The results of solving Equations (1) to (4) of the array in the horizontal direction are as the following Equations (13) to (16).

$$x_1 = \frac{k_2 k_3 + k_1 k_4 - \sqrt{-3k_2^2 k_3^2 + 4k_1 k_3^3 + 4k_2^3 k_4 - 6k_1 k_2 k_3 k_4 + k_1^2 k_4^2}}{2k_2^2 - 2k_1 k_3} \tag{13}$$

$$x_2 = \frac{k_2 k_3 - k_1 k_4 + \sqrt{-3k_2^2 k_3^2 + 4k_1 k_3^3 + 4k_2^3 k_4 - 6k_1 k_2 k_3 k_4 + k_1^2 k_4^2}}{2k_2^2 - 2k_1 k_3} \tag{14}$$

$$a_1 = \left(3k_2^5 k_3^2 - 4k_2^6 k_4 - 9k_1^2 k_2^2 k_3^2 k_4 - \right. \tag{15}$$
$$k_2^4 k_3\left(-14k_1 k_4 + \sqrt{-3k_2^2 k_3^2 + 4k_1 k_3^3 + 4k_2^3 k_4 - 6k_1 k_2 k_3 k_4 + k_1^2 k_4^2}\right) + k_1^2 k_2$$
$$k_3\left(8k_3^3 + k_4\left(8k_1 k_4 - 5\sqrt{-3k_2^2 k_3^2 + 4k_1 k_3^3 + 4k_2^3 k_4 - 6k_1 k_2 k_3 k_4 + k_1^2 k_4^2}\right)\right) + $$
$$k_1 k_2^2\left(-10k_3^3 + \right.$$
$$k_4\left(-5k_1 k_4 + 3\sqrt{-3k_2^2 k_3^2 + 4k_1 k_3^3 + 4k_2^3 k_4 - 6k_1 k_2 k_3 k_4 + k_1^2 k_4^2}\right)\right) + $$
$$k_1^2\left(-k_1^2 k_4^3 + 2k_3^3\sqrt{-3k_2^2 k_3^2 + 4k_1 k_3^3 + 4k_2^3 k_4 - 6k_1 k_2 k_3 k_4 + k_1^2 k_4^2} + \right.$$
$$\left.\left. k_1 k_4\left(-4k_3^3 + k_4\sqrt{-3k_2^2 k_3^2 + 4k_1 k_3^3 + 4k_2^3 k_4 - 6k_1 k_2 k_3 k_4 + k_1^2 k_4^2}\right)\right)\right) \Big/$$
$$\left(-6k_2^2 k_3^4 + 8k_1 k_3^5 + 14k_2^3 k_3^2 k_4 - 20k_1 k_2 k_3^3 k_4 - \right.$$
$$\left. 8k_2^4 k_4^2 + 12k_1 k_2^2 k_3 k_4^2 + 2k_1^2 k_3^2 k_4^2 - 2k_1^2 k_2 k_4^3\right)$$

$$a_2 = \left(3k_2^5 k_3^2 - 4k_2^6 k_4 - 9k_1^2 k_2^2 k_3^2 k_4 + \right.$$
$$k_2^4 k_3\left(14k_1 k_4 + \sqrt{-3k_2^2 k_3^2 + 4k_1 k_3^3 + 4k_2^3 k_4 - 6k_1 k_2 k_3 k_4 + k_1^2 k_4^2}\right) - $$
$$k_1 k_2^2\left(10k_3^3 + k_4\left(5k_1 k_4 + 3\sqrt{-3k_2^2 k_3^2 + 4k_1 k_3^3 + 4k_2^3 k_4 - 6k_1 k_2 k_3 k_4 + k_1^2 k_4^2}\right)\right) + $$
$$k_1^2 k_2 k_3\left(8k_3^3 + k_4\left(8k_1 k_4 + 5\sqrt{-3k_2^2 k_3^2 + 4k_1 k_3^3 + 4k_2^3 k_4 - 6k_1 k_2 k_3 k_4 + k_1^2 k_4^2}\right)\right) - $$
$$k_1^2\left(k_1^2 k_4^3 + 2k_3^3\sqrt{-3k_2^2 k_3^2 + 4k_1 k_3^3 + 4k_2^3 k_4 - 6k_1 k_2 k_3 k_4 + k_1^2 k_4^2} + \right.$$
$$\left.\left. k_1 k_4\left(4k_3^3 + k_4\sqrt{-3k_2^2 k_3^2 + 4k_1 k_3^3 + 4k_2^3 k_4 - 6k_1 k_2 k_3 k_4 + k_1^2 k_4^2}\right)\right)\right) \Big/$$
$$\left(-6k_2^2 k_3^4 + 8k_1 k_3^5 + 14k_2^3 k_3^2 k_4 - 20k_1 k_2 k_3^3 k_4 - 8k_2^4 k_4^2 + \right.$$
$$\left. 12k_1 k_2^2 k_3 k_4^2 + 2k_1^2 k_3^2 k_4^2 - 2k_1^2 k_2 k_4^3\right)$$

From Equations (7) to (10), $b_1$, $b_2$, $y_1$, and $y_2$ can be similarly expressed by received signals $k_5$, $k_6$, $k_7$, and $k_8$ for the vertical array.

Needless to say, the relational expressions of $a_1$, $a_2$, $x_1$, $x_2$ and $k_1$ to $k_4$ shown above can express substantially the same mathematical expressions in any way by any method such as transformation of the expressions, replacement of variables, and reordering. Therefore, the series of expressions shown here is only an example of one of the equivalent expressions, and does not limit the possibility of substantially equivalent expressions by other formats of expression.

Here, it is assumed that the relationship between $x_i$ and $\alpha_i$ and the relationship between $y_i$ and $\beta_i$ are expressed by the following Equations (17) and (18) with respect to i=1, 2. Arg(•) is a function for obtaining the argument of a complex number.

$$\alpha_i = \text{Arg}(x_i) \tag{17}$$

$$\beta_i = \text{Arg}(y_i) \tag{18}$$

At this time, the incoming angles of each of the incoming waves can be expressed by Equations (19) and (20) below.

$$\phi_i = \tan^{-1}\left(\frac{\beta d_x}{\alpha d_y}\right) \tag{19}$$

$$\theta_i = \sin^{-1}\left(\sqrt{\frac{2\pi}{\lambda}\left(\frac{\alpha^2}{d_x^2} + \frac{\beta^2}{d_y^2}\right)}\right) \tag{20}$$

The above is an incoming angle estimation method in a case where up to two incoming waves are assumed using an array of four elements in both horizontal and vertical directions. Similarly, for example, if an array of six elements is used, incoming waves of up to three waves can be allowed. If an array of eight elements is used, incoming waves of up to four waves can be estimated.

Therefore, as similar to the case of four elements, in a case where the maximum value of the number of incoming waves is 3 in six elements, the received values $k_1'$ to $k_6'$ of the horizontal array can be expressed as Equations (21) to (26) below.

$$k'_1 = a_1x_1 + a_2x_2 + a_3x_3 \tag{21}$$

$$k'_2 = a_1x_1^2 + a_2x_2^2 + a_3x_3^2 \tag{22}$$

$$k'_3 = a_1x_1^3 + a_2x_2^3 + a_3x_3^3 \tag{23}$$

$$k'_4 = a_1x_1^4 + a_2x_2^4 + a_3x_3^4 \tag{24}$$

$$k'_5 = a_1x_1^5 + a_2x_2^5 + a_3x_3^5 \tag{25}$$

$$k'_6 = a_1x_1^6 + a_2x_2^6 + a_3x_3^6 \tag{26}$$

The received value of the vertical array $k_7'$ to $k_{12}'$ can be expressed as Equations (27) to (32) below.

$$k'_7 = b_1y_1 + b_2y_2 + b_3y_3 \tag{27}$$

$$k'_8 = b_1y_1^2 + b_2y_2^2 + b_3y_3^2 \tag{28}$$

$$k'_9 = b_1y_1^3 + b_2y_2^3 + b_3y_3^3 \tag{29}$$

$$k'_{10} = b_1y_1^4 + b_2y_2^4 + b_3y_3^4 \tag{30}$$

$$k'_{11} = b_1y_1^5 + b_2y_2^5 + b_3y_3^5 \tag{31}$$

$$k'_{12} = b_1y_1^6 + b_2y_2^6 + b_3y_3^6 \tag{32}$$

Even in a case where the maximum value of the number of incoming waves is 4 in eight elements, the received value $k_1''$ to $k_8''$ of the horizontal array can be expressed as Equations (33) to (40) below.

$$k''_1 = a_1x_1 + a_2x_2 + a_3x_3 + a_4x_4 \tag{33}$$

$$k''_2 = a_1x_1^2 + a_2x_2^2 + a_3x_3^2 + a_4x_4^2 \tag{34}$$

$$k''_3 = a_1x_1^3 + a_2x_2^3 + a_3x_3^3 + a_4x_4^3 \tag{35}$$

$$k''_4 = a_1x_1^4 + a_2x_2^4 + a_3x_3^4 + a_4x_4^4 \tag{36}$$

$$k''_5 = a_1x_1^5 + a_2x_2^5 + a_3x_3^5 + a_4x_4^5 \tag{37}$$

$$k''_6 = a_1x_1^6 + a_2x_2^6 + a_3x_3^6 + a_4x_4^6 \tag{38}$$

$$k''_7 = a_1x_1^7 + a_2x_2^7 + a_3x_3^7 + a_4x_4^7 \tag{39}$$

$$k''_8 = a_1x_1^8 + a_2x_2^8 + a_3x_3^8 + a_4x_4^8 \tag{40}$$

The received values $k_9''$ to $k_{16}''$ of the vertical array can be expressed as Equations (41) to (48) below.

$$k''_9 = b_1y_1 + b_2y_2 + b_3y_3 + b_4y_4 \tag{41}$$

$$k''_{10} = b_1y_1^2 + b_2y_2^2 + b_3y_3^2 + b_4y_4^2 \tag{42}$$

$$k''_{11} = b_1y_1^3 + b_2y_2^3 + b_3y_3^3 + b_4y_4^3 \tag{43}$$

$$k''_{12} = b_1y_1^4 + b_2y_2^4 + b_3y_3^4 + b_4y_4^4 \tag{44}$$

$$k''_{13} = b_1y_1^5 + b_2y_2^5 + b_3y_3^5 + b_4y_4^5 \tag{45}$$

$$k''_{14} = b_1y_1^6 + b_2y_2^6 + b_3y_3^6 + b_4y_4^6 \tag{46}$$

$$k''_{15} = b_1y_1^7 + b_2y_2^7 + b_3y_3^7 + b_4y_4^7 \tag{47}$$

$$k''_{16} = b_1y_1^8 + b_2y_2^8 + b_3y_3^8 + b_4y_4^8 \tag{48}$$

As similar to the case of an array of four elements, the orientation angle of each incoming wave is given by an equation solved for each variable when these are regarded as simultaneous equations of six or eight elements.

In general, the array of M elements can be described by the following Equation (49).

$$k_m = \sum_{i=1}^{M/2} c_i z_i^m \quad (m = 1, \ldots, M) \tag{49}$$

In order to obtain a desired orientation angle from such simultaneous equations, several methods are conventionally known. For example, $z_i$ of the above equation can be obtained by a method called a classical-Prong method.

As a document related to the classical-Prong method, for example, the following document can be cited. R. Prony, "Essai Experimental et analytique," Journal de l'Ecole Polytechnique, vol. 1, 1795.

A solving method such as LS-Pony method, TLS-Prony method, or modified-Prony method, which is an improvement of the classical-Prony method, is also known.

As a document related to the LS-Pony method, for example, the following document can be cited. F. B. Hidebrand, Introduction to Numerical Analysis, second edition, Dover Publications.

As a document related to the TLS-Prony method, for example, the following document can be cited.

M. D. Rahman and K. B. Yu, "Total Least Square Approach for Frequency Estimation using Linear Prediction," IEEE Transactions on Acoustics, Speech, and Signal Processing, vol. ASSP-35, no. 10, October 1987.

As a document related to the modified-Prony method, for example, the following document can be cited. M. R. Osborne and G. K. Smyth, "A Modified Prony Algorithm for Fitting Functions Defined by Difference Equations," SIAM Journal on Scientific and Statistical Computing, March 1991.

Comparing these four solutions, the classical Prony method does not consider noise in the assumption, and thus has a problem of having a large sensitivity to noise in the calculation result. On the other hand, the LS-Pony method, the TLS-Prony method, and the modified-Prony method are methods for improving the noise problem of the classical-Prony method. In these improved algorithms, a mechanism for reducing noise sensitivity by using a least squares method is generally added.

However, these algorithms with improved noise resistance by the least squares method have a problem that predetermined performance cannot be obtained unless the number of incoming waves is accurately grasped in advance. In general, accurately grasping the number of incoming waves is not easy in consideration of the complexity of the actual propagation environment, and becomes a major problem. In the TLS-Prony method and the modified-Prony method, the calculation amount is significantly large, and the TLS-Prony method and the modified-Prony method are not desirable selections for configuring a small and low-power radar.

Therefore, in configuring a small and low-power radar, it is desirable to apply the classical-Prony method from the viewpoint of the amount of calculation, but it is necessary to solve the problem of resistance to noise described above.

For this problem, outliers of the output due to noise in the classical-Prony method are detected and excluded. As a result, for convenience, the orientation estimation accuracy can be improved, and the classical-Prony method can be made a practical method.

In such a novel incoming wave estimation method, there is no influence of a correlation between incoming waves and prior knowledge of a number of incoming waves, which are problems in conventional high-resolution algorithms such as the Capon method, the Music method, the Esprit method, and the Propagator method, and the problems of these conventional high-resolution incoming wave estimation algorithms are solved.

In this novel incoming wave estimation method, if the number of incoming waves larger than an allowable value of the maximum number of incoming waves determined by the number of arrays is input, a result rounded by an allowable maximum number of incoming waves is obtained. That is, for example, in the case of an array with eight antennas, up to four incoming waves are allowed, but in a case where five incoming waves are input, four of the five incoming waves are responded. Conversely, when there are only inputs of two incoming waves, the remaining two waves respond to any noise. Therefore, when the S/N is sufficiently high, the response in this case is apparently a response to only two incoming wave signals.

The two-dimensional incoming wave estimation method by the method of the present embodiment basically has an optimal configuration in a case where horizontal and vertical arrays are any of four elements, six elements, and eight elements. However, the two-dimensional incoming wave estimation method by the method of the present embodiment can also be applied to an array of any size. In this case, the method of the present embodiment is applied to a sub-array of a part of the original array. By using two or more sub-arrays in the same array and simultaneously applying the method of the present embodiment to a plurality of locations, a more robust estimation result may be obtained.

In the above, the case where the number of elements in the horizontal and vertical arrays is the same is taken as an example, but it goes without saying that these combinations are not limited thereto. For example, a combination such as an array of eight elements in the horizontal direction and four elements in the vertical direction may be used.

<3-2. Difference from Conventional Technology>

In Patent Literature 1 (JP 2017-508948W), a radar device estimates an "orientation angle frequency" of an incoming wave by the Root-Music method, which is a conventional high-resolution incoming wave estimation technology, and obtains a "complex amplitude" by a least squares method using an estimated value of the "orientation angle frequency". The radar device obtains a "complex phasor" determined for each incoming wave from the "complex amplitude" thus obtained, and finally obtains an orientation angle of the corresponding incoming wave from the "complex phasor".

However, in the incoming angle estimation method disclosed in Patent Literature 1, since an incoming wave is estimated using the Root-Music method, it is essentially necessary to know an accurate number of incoming waves in advance similarly to a conventional high-resolution algorithm such as the Music method, the Esprit method, or the Propagator method. Therefore, in an actual complicated environment in which it is difficult to accurately estimate the number of incoming waves, the accuracy of the orientation angle estimation is greatly deteriorated.

In the incoming angle estimation method of Patent Literature 1, since the incoming wave is estimated using the Root-Music method, as similar to the conventional high-resolution algorithm, the problem of the decrease in the antenna aperture length by the spatial average also occurs.

On the other hand, in the incoming wave estimation method of the present embodiment, it is possible to directly calculate a value corresponding to the "complex phasor" in Patent Literature 1 by a mathematical expression, and this fundamentally solves the problem caused by the conventional high-resolution algorithm.

<3-3. Array Arrangement Example>

In the example of FIG. 8, four-element antennas are arranged in two antenna arrays, but the antenna elements arranged in each antenna array are not limited to four elements. The antenna elements arranged in each antenna array may be six elements or eight elements. In the description below, an antenna array including N antennas (antenna elements) may be referred to as an antenna array having an array size of N arrays. Here, N is an arbitrary integer.

Figure 9:
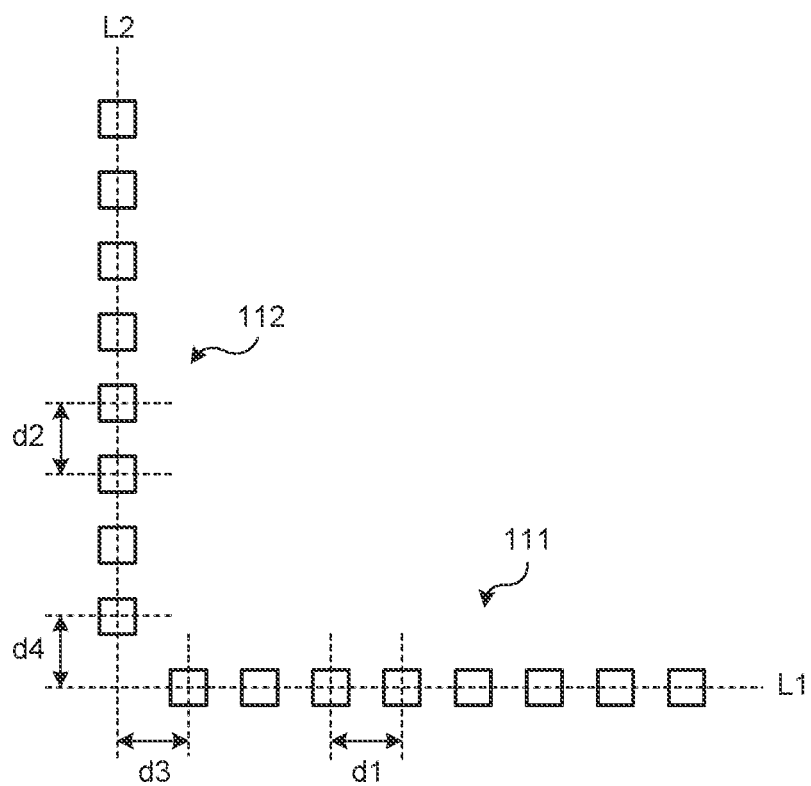
FIG. 9 is a diagram illustrating an example in which eight antenna elements are arranged in each of two antenna arrays.

FIG. 9 is a diagram illustrating an example in which eight antenna elements are arranged in each of two antenna arrays. That is, each of the antenna arrays 111, 112 illustrated in FIG. 9 is an antenna array having an antenna size of eight arrays. Both the antenna array 111 and the antenna array 112 are arrays arranged at an equal interval. The antenna interval d1 of the antenna array 111 and the antenna interval d2 of the antenna array 112 may be the same or different. The closest distance between the antenna array 111 and the antenna array 112 is longer than the antenna interval between the antenna array 111 and/or the antenna array 112. As described above, the closest distance between the antenna array 111 and the antenna array 112 does not mean the closest distance among the distances between the plurality of antennas included in the antenna array 111 and the plurality of antennas included in the antenna array 112.

The antenna array 111 may be arranged such that a distance d3 between an intersection of the straight line L1 and the straight line L2 and an antenna of the antenna array 111 closest to the intersection is equal to the antenna interval d1 of the antenna array 111. The antenna array 112 may be arranged such that a distance d4 between an intersection of the straight line L1 and the straight line L2 and an antenna of the antenna array 112 closest to the intersection is equal to the antenna interval d2 of the antenna array 112.

In the example of FIG. 9, eight elements are arranged in each antenna array, but these arrays may be so-called "virtual arrays". That is, the received data used in this algorithm may be, for example, received data obtained by a virtual array of 2×4 MIMO including two transmission antennas and four reception antennas as long as the received data is an array of eight elements.

Such an antenna array having an array size of eight arrays is one of implementation methods for achieving the best performance since the antenna array allows four incoming waves and can perform the incoming wave estimation using more pieces of acquired data.

However, it is needless to say that an array of six elements or four elements, which is easier to implement, may be used for any array depending on the degree of the requirement of the separation performance of the incoming wave. That is, the array size of the antenna array 111 and the array size of the antenna array 112 may be different. A combination of the array sizes is arbitrary.

At least one of the antenna array 111 and the antenna array 112 may be a MIMO virtual array. In this case, the array size of the antenna array 111 and/or the antenna array 112 may be any of four arrays, six arrays, and eight arrays. A combination of the array sizes is arbitrary.

At least one of the antenna array 111 and the antenna array 112 may be a sub-array obtained by cutting out an array portion arranged at an equal interval from an array having a predetermined size. In this case, the array size of the sub-array may be any of four arrays, six arrays, and eight arrays. Of course, both the antenna array 111 and the antenna array 112 may be sub-arrays obtained by cutting out an array portion arranged at an equal interval from an array having a predetermined size. Also in this case, the array size of the sub-array may be any of four arrays, six arrays, and eight arrays.

Figure 10:
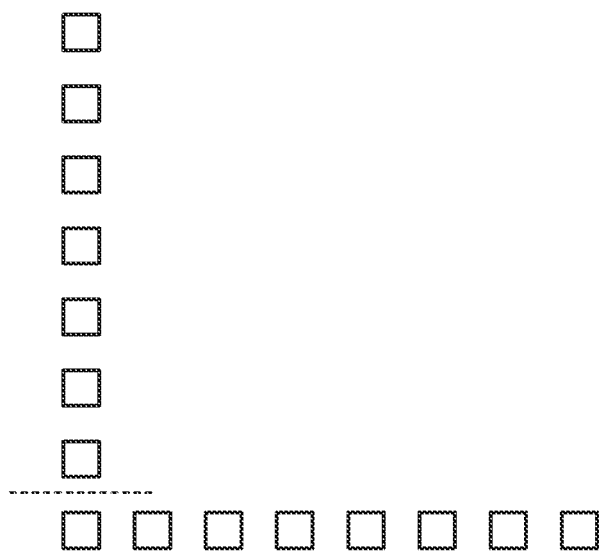
FIG. 10 is a diagram illustrating a typical L-shaped array.

FIG. 10 is a diagram illustrating a typical L-shaped array. Here, it is assumed that a circuit block connected to the reception antenna is a millimeter wave circuit. Assuming that a typical L-shaped array as illustrated in FIG. 10 is used as the reception antenna, the antenna element arranged at the intersection of the two arrays needs to be a component of either horizontal or vertical array. This is because, in general, the antenna circuit in the millimeter wave band is extremely susceptible to the influence of the impedance of the power supply circuit, and it is extremely difficult to provide two power supply points only to the antenna element arranged at the intersection while maintaining the same characteristics as other antennas.

Therefore, in conventional techniques, for example, the array is divided at the position of the dotted line illustrated in FIG. 10, and the horizontal array and the vertical array are mounted. However, at this time, the two arrays have no layout symmetry with respect to each other in terms of electromagnetic field, and the electromagnetic field influences on the other arrays are different from each other. As a result, the basic characteristics of the horizontal and vertical array antennas may be different and are undesirable.

Also, at this time, the accompanying millimeter wave transmission line circuits for supplying power to each antenna can be arranged in close proximity. There is a possibility that the substrate design considering such electromagnetic coupling or influence is accompanied with difficulty.

In the present embodiment, an array arrangement as illustrated in FIG. 8 or 9 is employed, and horizontal and vertical arrangements are symmetrical to each other in terms of electromagnetic field, and isolation is secured between the arrays. According to such an arrangement, the degree of freedom in designing a transmission line of the power supply circuit is also increased.

<3-4. Pairing>

The method for estimating the two-dimensional orientation of the incoming wave from the received value obtained in each antenna array has been described above. However, in a case where there are a plurality of incoming waves, in order to perform such two-dimensional orientation estimation, it is assumed that association processing called "pairing" has been performed on each incoming wave obtained by the antenna arrays in the horizontal direction and the vertical direction.

According to the method of the present embodiment, the signal value of the incoming wave at an arbitrary location can be reconstructed from the obtained information of the incoming wave by numerical calculation. Therefore, using this property, pairing in two-dimensional orientation estimation can be easily achieved.

Figure 11:
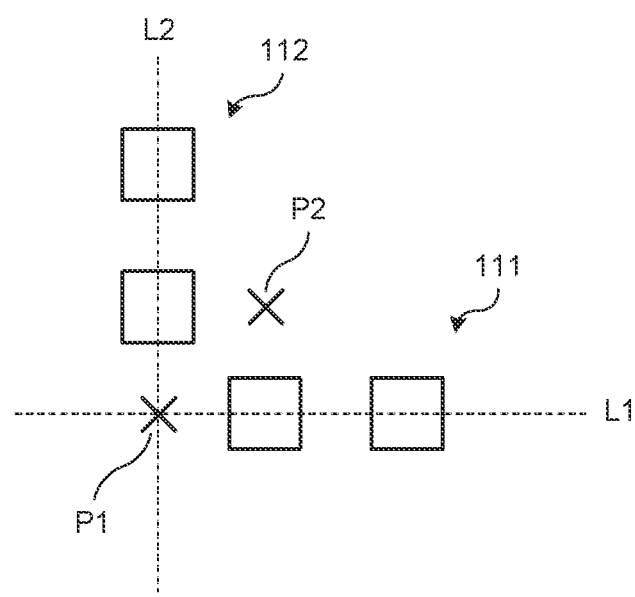
FIG. 11 is a diagram for explaining a reference point on a plane on which two antenna arrays are arranged.

FIG. 11 is a diagram for explaining a reference point on a plane on which two antenna arrays are arranged. As illustrated in FIG. 11, an intersection of extension lines of center lines of both antenna arrays in FIG. 8 is set as a reference point P1. A position aligned with the first antenna element of both antenna arrays is set as a reference point P2.

The pairing is performed by obtaining signal values of incoming waves of the antenna array 111 (horizontal array) and the antenna array 112 (vertical array) at these reference points using the method of the present embodiment.

For example, it is assumed that, when two incoming waves are input, signal values at the reference point P1 obtained from the antenna array 111 (horizontal array) are $a_1$ and $a_2$, and signal values at the reference point P1 obtained from the antenna array 112 (vertical array) are $b_1$ and $b_2$. At this time, if $a_1 \approx b_1$ and $a_2 \approx b_2$, it can be seen that the pair of first incoming waves is $a_1$ and $b_1$, and the pair of second incoming waves is $a_2$ and $b_2$. Alternatively, if $a_1 \approx b_2$ and $a_2 \approx b_1$, the first incoming wave pair is $a_1$ and $b_2$, and the second incoming wave pair is $a_2$ and $b_1$.

In the method of the present embodiment, the point of the reference point at which the pairing is performed may be an arbitrary point in principle. For example, at the reference point P2, the signal values obtained from the horizontal array are $a_1 xy$ and $a_2 xy$, while the signal values at the reference point P1 obtained from the vertical array are $b_1 yx$ and $b_2 yx$. At this time, if $a_1 xy \approx b_1 yx$ and $a_2 xy \approx b_2 yx$, it can be seen that the pair of first incoming waves is $a_1$ and $b_1$, and the pair of second incoming waves is $a_2$ and $b_2$. Alternatively, if $a_1 xy \approx b_2 yx$ and $a_2 xy \approx b_1 yx$, the pair of first incoming waves is $a_1$ and $b_2$, and the pair of second incoming waves is $a_2$ and $b_1$.

The orientation integration unit performs such pairing and identifies incoming waves from the results of the antenna array 111 (horizontal array) and the antenna array 112 (vertical array).

<3-5. Modification of Array Arrangement>

As described above, in the method of the present embodiment, the signal value of the incoming wave at the appropriately determined reference point can be calculated. Therefore, by using this, signal values at the reference points of the incoming waves detected by the antenna array 111 (horizontal array) and the antenna array 112 (vertical array) are calculated and collated, so that pairing between arrays arranged at arbitrary positions can be performed.

Figure 12:
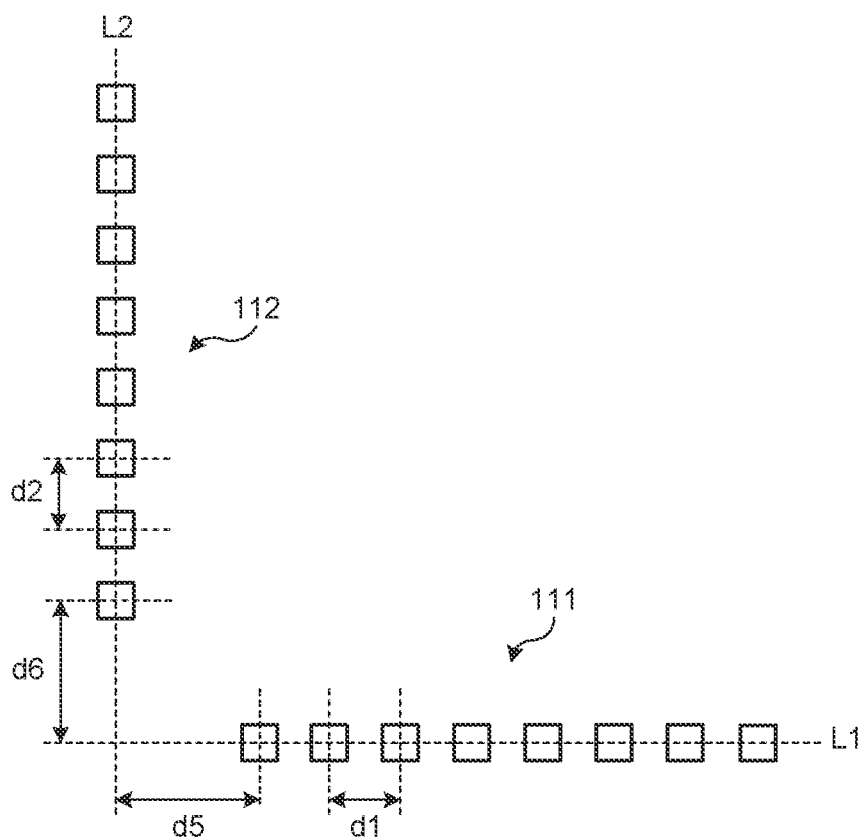
FIG. 12 is a diagram illustrating a modification of the array arrangement.

FIG. 12 is a diagram illustrating a modification of the array arrangement. Both antenna arrays 111 and 112 illustrated in FIG. 12 are arrays arranged at an equal interval.

Specifically, FIG. 12 illustrates an embodiment in a case where an antenna array of eight elements is separated from an intersection of extension lines of both antenna arrays by twice the inter-element distance of each array. In this case, when the intersection of the center lines of the array is defined as the reference point, the signal values of the incoming waves detected by the horizontal and vertical arrays at the reference point of the first incoming wave are $a_1 x_1^{-1}$ and $b_1 y_1^{-1}$, respectively. For the second incoming wave, the signal values of the incoming waves detected in the horizontal and vertical arrays are $a_2 x_2^{-1}$ and $b_2 y_2^{-1}$, respectively.

The distance to the intersection is not limited to twice the antenna interval. For example, the antenna array 111 may be arranged such that a distance d5 between an intersection of the straight line L1 and the straight line L2 and an antenna of the antenna array 111 closest to the intersection is an integral multiple (for example, 1, 2, 3, 4, . . . times) of the antenna interval d1 of the antenna array 111. The antenna array 112 may be arranged such that a distance d6 between an intersection of the straight line L1 and the straight line L2 and an antenna of the antenna array 112 closest to the intersection is an integral multiple (for example, 1, 2, 3, 4, . . . times) of the antenna interval d2 of the antenna array 112.

The distance to the intersection may not be an integral multiple of the antenna interval. For example, the antenna array 111 may be arranged such that the distance d5 between an intersection of the straight line L1 and the straight line L2 and an antenna of the antenna array 111 closest to the intersection is a fractional multiple of the antenna interval d1 of the antenna array 111 (for example, 3/2, 5/3, . . . times). The antenna array 112 may be arranged such that the distance d6 between an intersection of the straight line L1 and the straight line L2 and an antenna of the antenna array 112 closest to the intersection is an integral multiple (for example, 3/2, 5/3, . . . times) of the antenna interval d2 of the antenna array 112.

Pairing of incoming waves detected in horizontal and vertical arrays is performed by comparing these values in a manner similar to the above.

In the pairing method according to the present embodiment, the reference point is not necessarily an intersection on an extension line of both antenna arrays as described above. Such a reference point does not need to be a location at a distance of an integral multiple of the element interval on a straight line on which the antenna array is extrapolated. According to the calculation method of the present embodiment, for example, if γ is a fractional value in $a_1 x_1^\gamma$, it is possible to calculate the signal value of the incoming wave at an arbitrary position. Therefore, in principle, the relative positions of the horizontal and vertical arrays can be arbitrarily set. However, practically, in consideration of ease of implementation, it is desirable to select an integer value for γ.

Figure 13:
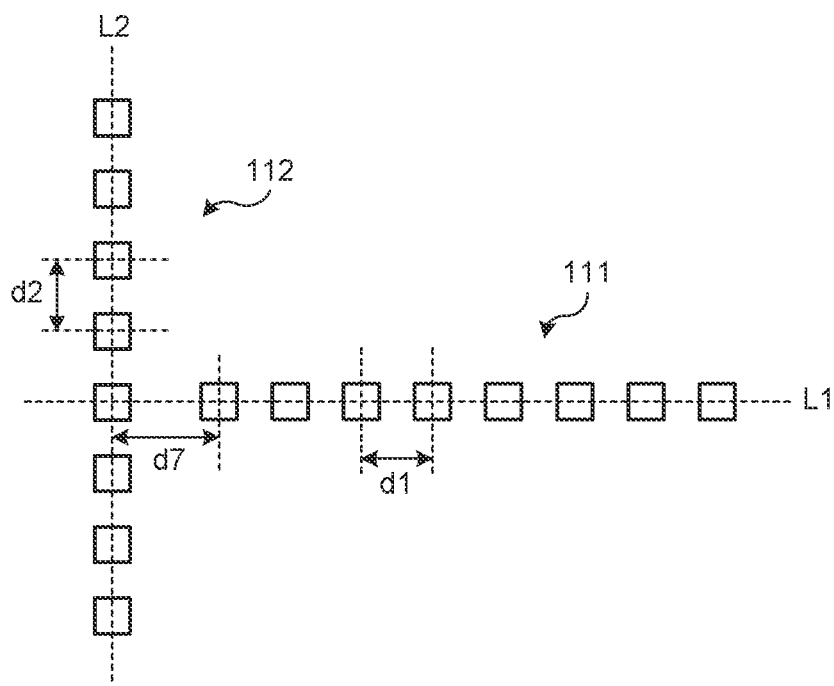
FIG. 13 is a diagram illustrating another modification of the array arrangement.

FIG. 13 is a diagram illustrating another modification of the array arrangement. In the modification illustrated in FIG. 13, the horizontal and vertical intersections coincide with specific points of the vertical array. More specifically, in the example of FIG. 13, the antenna array 111 is arranged such that a distance D7 between an intersection of the straight line L1 and the straight line L2 and an antenna of the antenna array 111 closest to the intersection is an integral multiple or a fractional multiple of the antenna interval of the antenna array 111. The antenna array 112 is arranged such that one of the plurality of antennas constituting the antenna array 112 is located at an intersection of the intersection straight line L1 and the straight line L2. Such a case can also be implemented by the method of the present embodiment.

4. OPERATION OF RADAR DEVICE

Next, an operation of the radar device 10 will be described.

Figure 14:
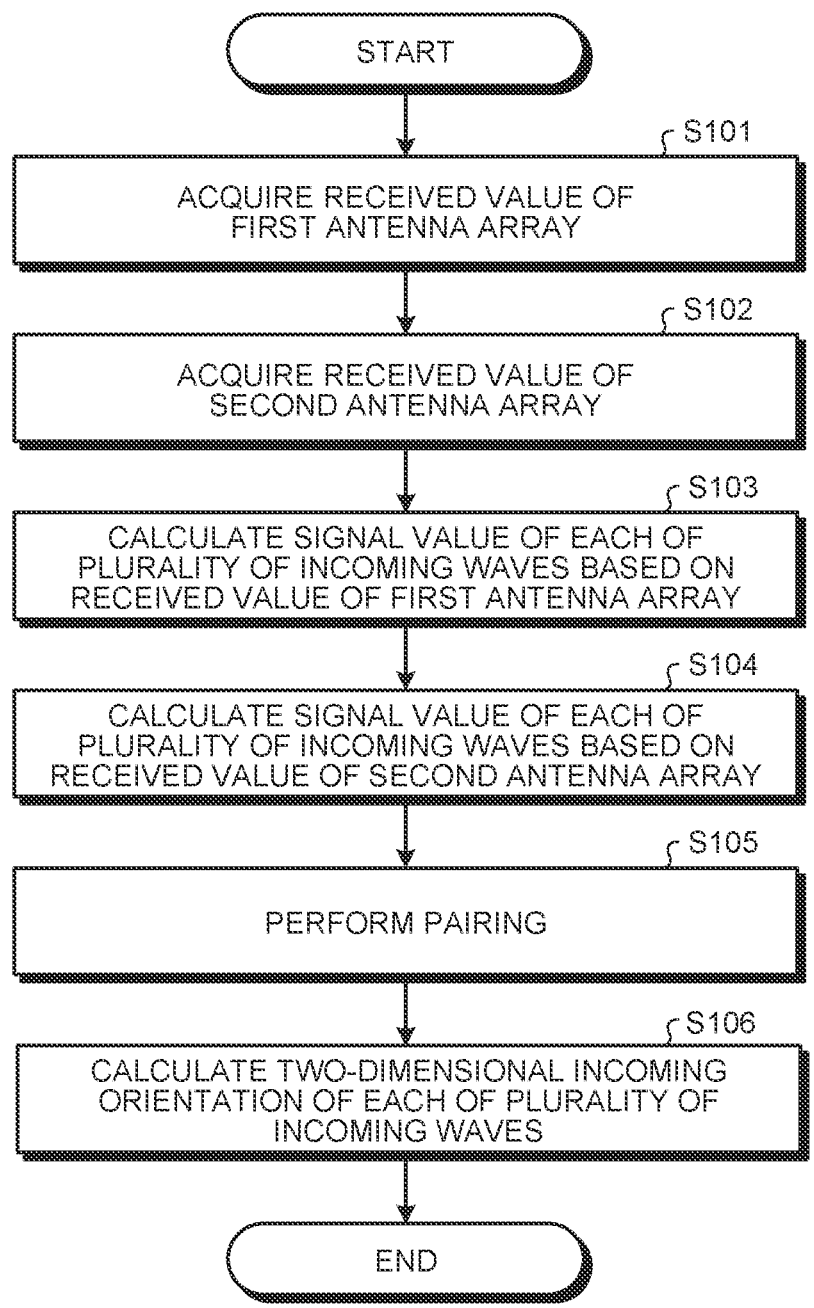
FIG. 14 is a flowchart illustrating incoming wave estimation processing according to the present embodiment.

FIG. 14 is a flowchart illustrating incoming wave estimation processing according to the present embodiment. The incoming wave estimation processing is processing for calculating an orientation in which one or more objects are located. When the start of the processing is instructed by the user, the radar device 10 starts the incoming wave estimation method processing. Hereinafter, the incoming wave estimation processing will be described with reference to the flowchart of FIG. 14.

The first acquisition unit 131 acquires received values of signals received by a plurality of antennas included in the antenna array 111 (first antenna array) (step S101).

The second acquisition unit 132 acquires received values of signals received by a plurality of antennas included in the antenna array 112 (second antenna array) (step S102).

The calculation unit 133 calculates the two-dimensional incoming orientation of one or a plurality of incoming waves on the basis of the received values of the signals received by the plurality of antennas included in the antenna array 111 and the received values of the signals received by the plurality of antennas included in the antenna array 112. Specifically, the calculation unit 133 performs processing of steps S102 to S016 described below.

First, the first signal value calculation unit 133a of the calculation unit 133 calculates a signal value of each of a plurality of incoming waves at a predetermined reference point on the plane where the antenna array 111 and the antenna array 112 are arranged on the basis of the received value of the signal received by the antenna array 111 (step S103). At this time, the first signal value calculation unit 133a calculates the signal value of each of the plurality of incoming waves by solving a first relational expression indicating the relationship between the received value and the signal value of the incoming wave on the basis of the received values of the plurality of antennas included in the antenna array 111. Here, the first relational expression is, for example, a closed relational expression closed as an explicit function, and the first signal value calculation unit 133a can calculate the signal value of each of the plurality of incoming waves only by open calculation and four arithmetic operations.

For example, assuming that the antenna array 111 includes four antennas, the first relational expression is a four-variable simultaneous equations in four unknowns as shown in the above Formulas (1) to (4). At this time, the signal value of each of the plurality of incoming waves calculated by the first signal value calculation unit 133a is a solution of the simultaneous equations in four unknowns.

Assuming that the antenna array 111 includes six antennas, the first relational expression is a six-variable simultaneous equations in six unknowns as shown in the above Formulas (21) to (26), for example. At this time, the signal value of each of the plurality of incoming waves calculated by the first signal value calculation unit 133a is a solution of the simultaneous equations in six unknowns.

Assuming that the antenna array 111 includes eight antennas, the first relational expression is an eight-variable simultaneous equations in eight unknowns as shown in the above Formulas (33) to (40), for example. At this time, the signal value of each of the plurality of incoming waves calculated by the first signal value calculation unit 133a is a solution of the simultaneous equations in eight unknowns.

Next, the second signal value calculation unit 133b of the calculation unit 133 calculates a signal value of each of a plurality of incoming waves at a predetermined reference point on the plane where the antenna array 111 and the antenna array 112 are arranged on the basis of the received value of the signal received by the antenna array 112 (step S104). At this time, the second signal value calculation unit 133b calculates the signal value of each of the plurality of incoming waves by solving a second relational expression indicating the relationship between the received values of the plurality of antennas included in the antenna array 112 and the signal value of the incoming wave on the basis of the received values. Here, the second relational expression is, for example, a closed relational expression closed as an explicit function, and the second signal value calculation unit 133b can calculate the signal value of each of the plurality of incoming waves only by open calculation and four arithmetic operations.

For example, assuming that the antenna array 112 includes four antennas, the second relational expression is a four-variable simultaneous equations in four unknowns as shown in the above Formulas (7) to (10). At this time, the signal value of each of the plurality of incoming waves calculated by the second signal value calculation unit 133b may be a solution of the simultaneous equations in four unknowns.

Assuming that the antenna array 112 includes six antennas, the second relational expression is a six-variable simultaneous equations in six unknowns as shown in the above Formulas (27) to (32), for example. At this time, the signal value of each of the plurality of incoming waves calculated by the second signal value calculation unit 133b may be a solution of the simultaneous equations in six unknowns.

Assuming that the antenna array 112 includes eight antennas, the second relational expression is an eight-variable simultaneous equations in eight unknowns as shown in the above Formulas (41) to (48), for example. At this time, the signal value of each of the plurality of incoming waves calculated by the second signal value calculation unit 133b may be a solution of the simultaneous equations in eight unknowns.

The array size of the antenna array 111 and the array size of the antenna array 112 may be different.

The determination unit 133c of the calculation unit 133 performs pairing (step S105). Specifically, the determination unit 133c determines the correspondence relationship between the plurality of incoming waves in the first signal value calculation unit 133a and the plurality of incoming waves in the second signal value calculation unit 133b on the basis of the signal values of the plurality of incoming waves calculated by the first signal value calculation unit 133a and the signal values of the plurality of incoming waves calculated by the second signal value calculation unit 133b.

The orientation calculation unit 133d calculates a two-dimensional incoming orientation of each of the plurality of incoming waves on the basis of the determination result of the determination unit 133c (step S106).

5. VERIFICATION OF RESOLUTION PERFORMANCE OF INCOMING WAVE

The signal value calculation at an arbitrary point of the present embodiment described so far is for the purpose of pairing, and the signal value of the incoming wave at the point defined as the reference point is calculated. However, in other words, if the method of reconstructing the incoming wave signal value of the present embodiment is used, received data can be obtained by calculation as if an antenna exists at the position to which the array is extended with respect to the original array. This means that in the case of an array of eight elements, the array can be extended to any size using the original eight pieces of array data.

Figure 15:
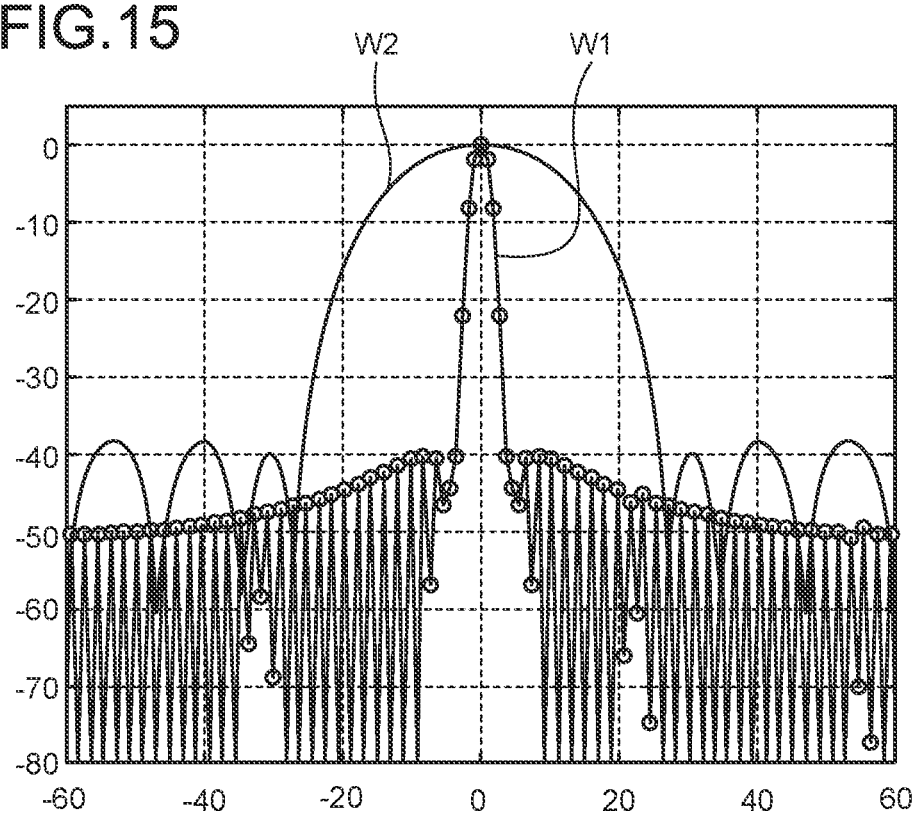
FIG. 15 is a diagram illustrating an orientation spectrum by FFT when an incoming wave is one wave.
Figure 16:
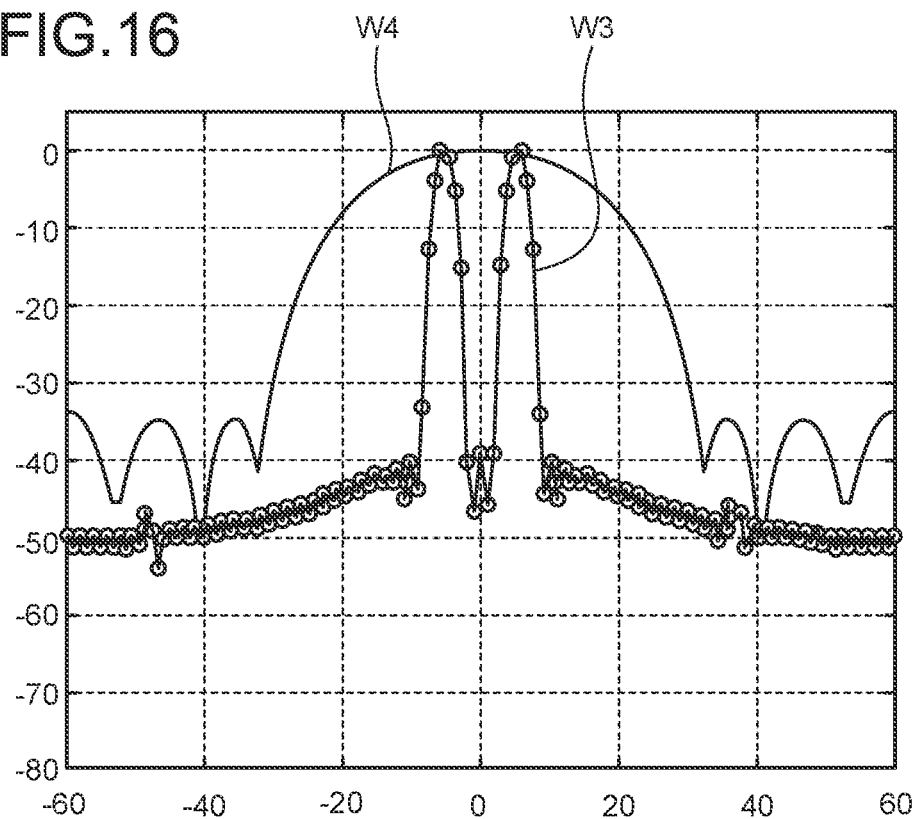
FIG. 16 is a diagram illustrating an orientation spectrum by FFT when there are two incoming waves.

Based on such an idea, here, in order to clarify the incoming wave separation performance of the method of the present embodiment, 56 signal values are reconstructed from the original data of 8 arrays, and an array having 64 reception points in total is generated. FIG. 15 is a diagram illustrating an orientation spectrum by FFT when an incoming wave is one wave. FIG. 16 is a diagram illustrating an orientation spectrum by FFT when there are two incoming waves. The results shown in these drawings are formally one-dimensional display, but it is understood that a cross section in a horizontal or vertical axis in a two-dimensional case is viewed.

These drawings are used for convenience of observing the situation of the separation performance of the incoming angle by the method according to the present embodiment, and the method of the present embodiment does not require the orientation spectrum in the calculation process.

In FIG. 15, a plot W1 is an FFT spectrum equivalent to 64 arrays in a case where the arrays are equivalently enlarged by eight times by the signal value reconstruction method according to the method of the present embodiment. A plot W2 is an FFT spectrum obtained from the original eight pieces of data. A Taylor window with a side lobe level of −40 dB was used as a window function in FFT. The incoming wave was one wave coming from the front, 0 degree direction.

As can be seen from FIG. 15, by increasing the apparent reception data by the method of the present embodiment, the fundamental frequency of the FFT decreases, and as a result, it can be confirmed that the orientation spectrum becomes steeper.

FIG. 16 illustrates a case where incoming waves of two waves are input from a direction of ±5°. In FIG. 16, a plot W3 is an FFT spectrum equivalent to 64 arrays in a case where the arrays are equivalently enlarged by eight times by the signal value reconstruction method according to the method of the present embodiment. A plot W4 is an FFT spectrum obtained from the original eight pieces of data. In this case, in the FFT based on the original eight-element antenna data, the two incoming waves cannot be separated at all. On the other hand, according to the method of the present embodiment, since the array size is enlarged eight times, it can be confirmed that the two targets can be clearly separated.

As illustrated in FIG. 16, in the incoming wave estimation by the method of the present embodiment, significantly improved high incoming wave separation performance can be imparted to the horizontal and vertical arrays. In other words, if the method of the present embodiment is used as a means for estimating incoming waves in a horizontal array and a vertical array, a 2D radar integrating these results has high resolution performance completely different from separation performance by conventional FFT. Therefore, the 2D radar including the orientation estimation according to the present embodiment provides an improved 2D radar having flexibility of a high array layout, robustness that is not affected by the accurate number of incoming waves and the presence or absence of correlation, and high incoming wave separation performance.

As a more general case, it is also possible to apply the classical-Prony method, which can be solved with a relatively small amount of calculation, to the M antenna. When the classical-Prony method is applied, it is desired to improve noise resistance, but a specific method thereof will be disclosed here.

It is known that, when the given equation is transformed, it is expressed by a polynomial equation such as Formula (50) below, and the solution z when this equation is solved is $z_i$ including orientation angle information.

$$\sum_{k=0}^{M/2} h_k z^{M-k} = 0 (h_0 = 1) \quad (50)$$

However, the coefficient of the polynomial equation is given by Formula (51) below.

$$\begin{pmatrix} h_1 \\ h_2 \\ \vdots \\ h_M \end{pmatrix} = \begin{pmatrix} k_M & k_{M-1} & \cdots & k_1 \\ k_{M+1} & k_M & \cdots & k_2 \\ \vdots & \vdots & \ddots & \vdots \\ k_{2M-1} & k_{2M-2} & \cdots & k_M \end{pmatrix}^{-1} \begin{pmatrix} k_{M+1} \\ k_{M+2} \\ \vdots \\ k_{2M} \end{pmatrix} \quad (51)$$

The amplitude $c_i$ is obtained from $z_i$ and $k_i$ obtained in this manner, for example, as shown in Formula (52). The above is the solution of the classical-Prony method.

$$\begin{pmatrix} c_1 \\ c_2 \\ \vdots \\ c_p \end{pmatrix} = \begin{pmatrix} 1 & 1 & \cdots & 1 \\ z_1 & z_2 & \cdots & z_M \\ \vdots & \vdots & \ddots & \vdots \\ z_1^{M-1} & z_2^{M-1} & \cdots & z_M^{p-1} \end{pmatrix} \begin{pmatrix} k_1 \\ k_2 \\ \vdots \\ k_M \end{pmatrix} \quad (52)$$

At this time, for example, a transformation matrix portion is extracted for M=8, and a matrix V as shown in Formula (53) below is defined.

$$V = \begin{pmatrix} 1 & 1 & 1 & 1 \\ z_1 & z_2 & z_3 & z_4 \\ z_1^2 & z_2^2 & z_3^2 & z_4^2 \\ z_1^3 & z_2^3 & z_3^3 & z_4^3 \end{pmatrix} \quad (53)$$

Then, a discriminant represented by Formula (54) below is determined for this matrix.

$$D = |\det(V)| = |z_1 - z_2||z_1 - z_3||z_1 - z_4||z_2 - z_3||z_2 - z_4||z_3 - z_4| \quad (54)$$

An outlier due to noise is detected by comparing the D value obtained here with a predetermined threshold. Theoretically, the D value takes a value equal to or greater than 0 and equal to or less than 16. However, for example, when the D value is equal to or greater than a predetermined value, it is determined that the normal operation is performed, and when the D value is less than the predetermined value, it is determined that the abnormal operation of outputting an outlier is performed. For example, when 5 is adopted as the threshold of the D value, the following determination is made.

Although the case of M=8 has been described above for the sake of convenience, M may take an arbitrary value in forming the present discriminant, and is not limited thereto.

Figure 17:
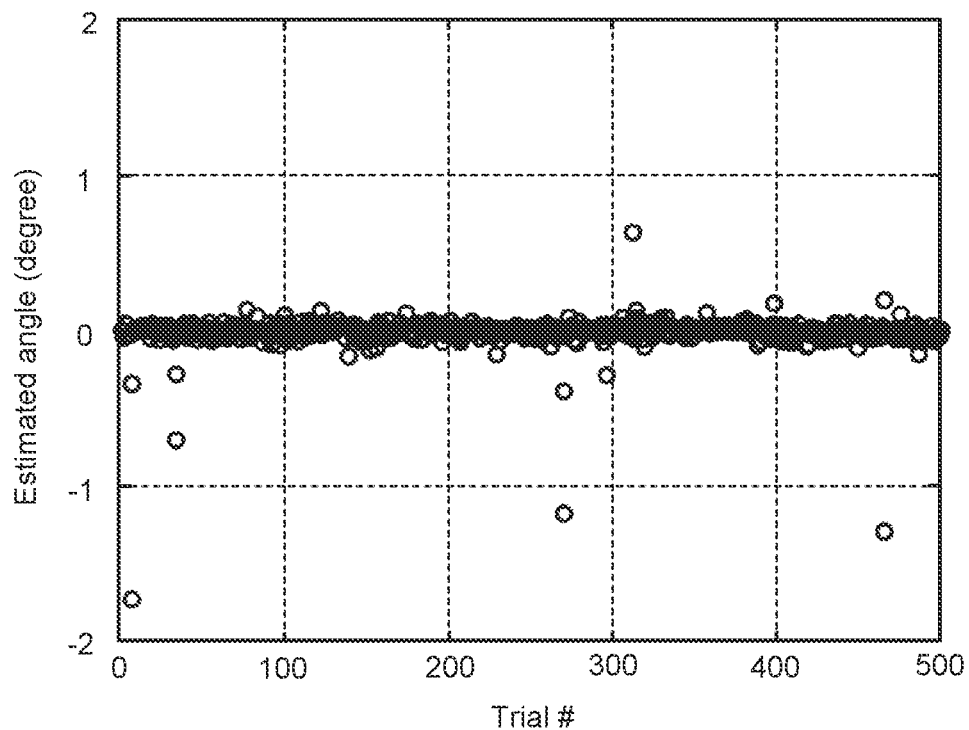
FIG. 17 is a diagram illustrating a result (one wave) of only the classical-Prony method.
Figure 18:
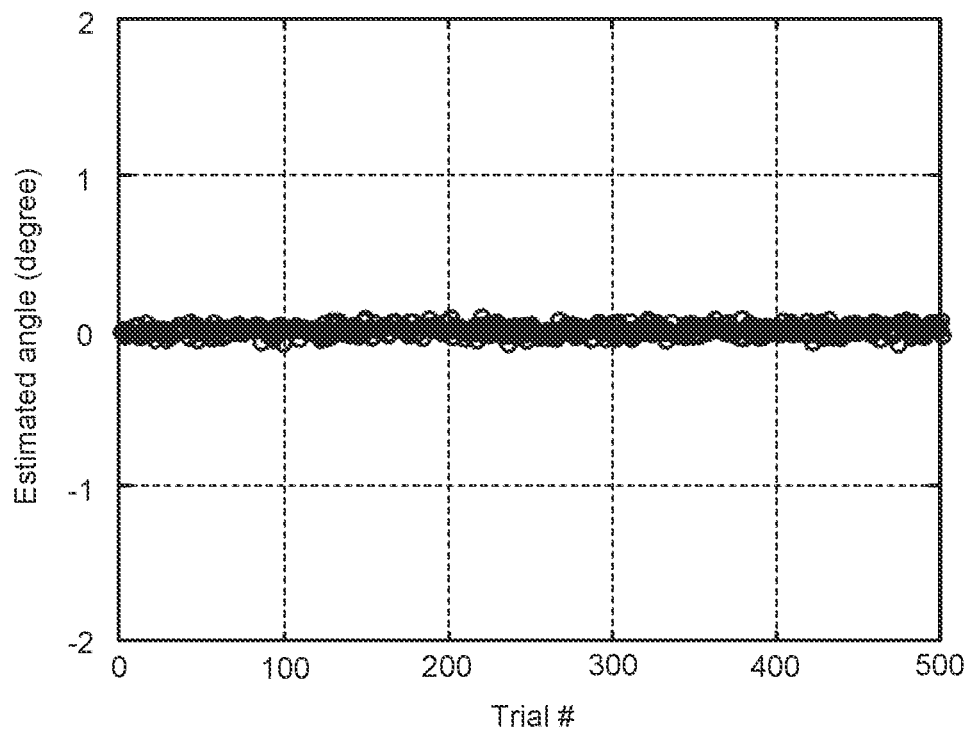
FIG. 18 is a diagram illustrating a result (one wave) obtained by adding a discriminant to the classical-Prony method.

FIGS. 17 and 18 illustrate a result of estimating an incoming wave from 0° by the classical-Prony method and a result of adding the above discriminant to the classical-Prony method. FIG. 17 is a diagram illustrating a result (one wave) of only the classical-Prony method. FIG. 17 is a diagram illustrating a result (one wave) of only the classical-Prony method. FIG. 18 is a diagram illustrating a result (one wave) obtained by adding a discriminant to the classical-Prony method. In any case, the number of trials is 500, the incoming wave is one wave, and the S/N is 40 dB.

From these, it can be seen that a result indicating a large outlier can be efficiently excluded by the noise pattern.

Figure 19:
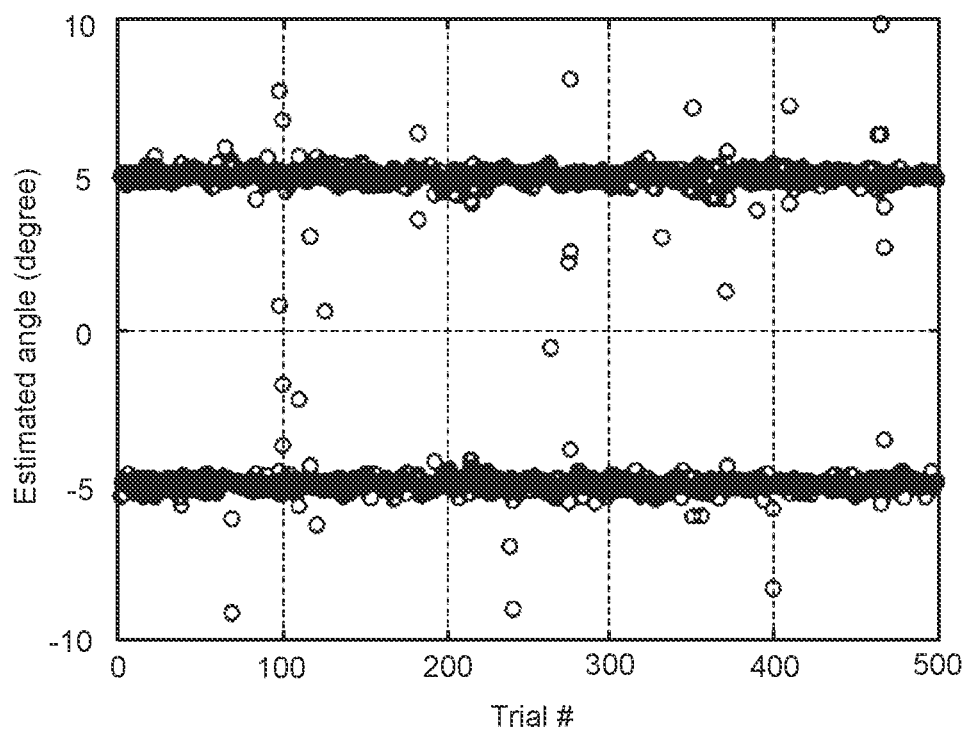
FIG. 19 is a diagram illustrating a result (two waves) of only the classical-Prony method.
Figure 20:
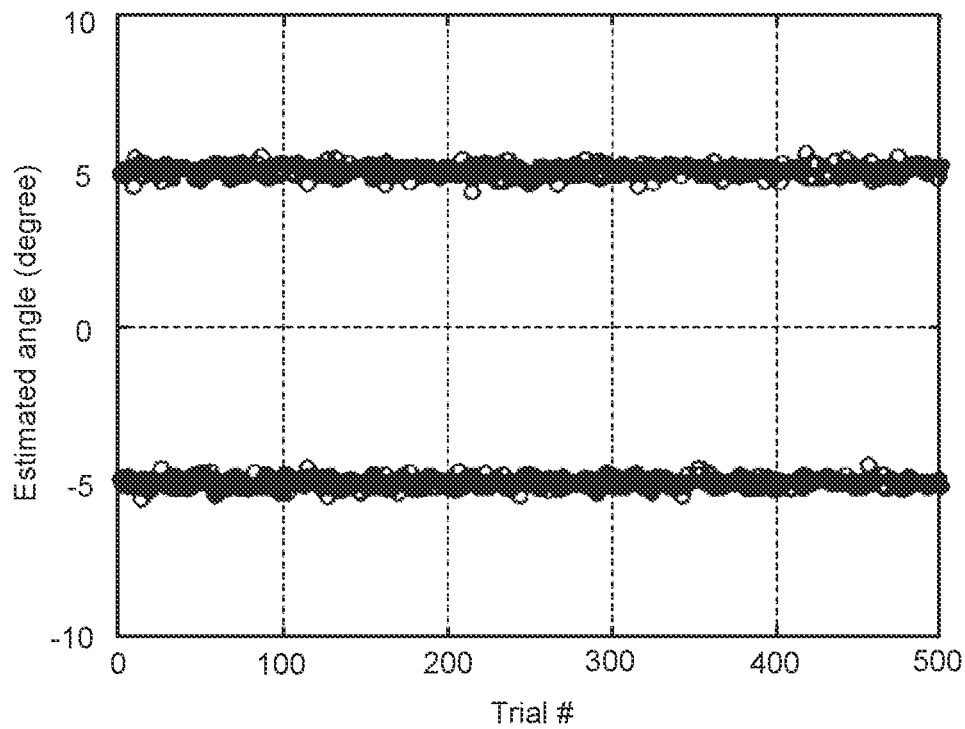
FIG. 20 is a diagram illustrating a result (two waves) obtained by adding a discriminant to the classical-Prony method.

FIGS. 19 and 20 illustrate a case where there are two incoming waves. FIG. 19 is a diagram illustrating a result (two waves) of only the classical-Prony method. FIG. 20 is a diagram illustrating a result (two waves) obtained by adding a discriminant to the classical-Prony method. In both cases, the orientation of the incoming wave is ±5°, and the S/N of the signal is 40 dB.

From these, there is some degree of freedom in the selection of the calculation method in the orientation estimation of the incoming wave in each array, but if the classical-Prony method is used, it is desirable to use the method after improving the noise resistance with the improvement of the detection accuracy of the orientation by such a discriminant.

FIGS. 21 to 24 are diagrams illustrating simulation results of two-dimensional orientation estimation by a computer in a case where the array configuration illustrated in FIG. 8 is used. A beat signal generated by a computer is used as a signal of an incoming wave.

Figure 21:
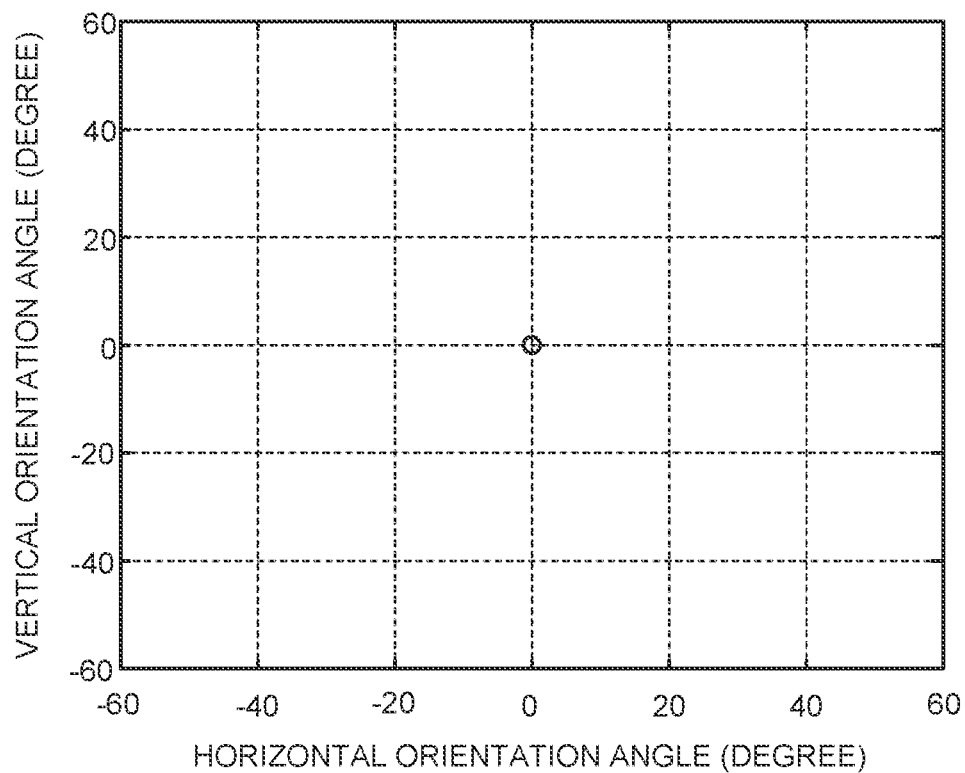
FIG. 21 is a diagram illustrating a simulation result of two-dimensional orientation estimation by a computer.
Figure 22:
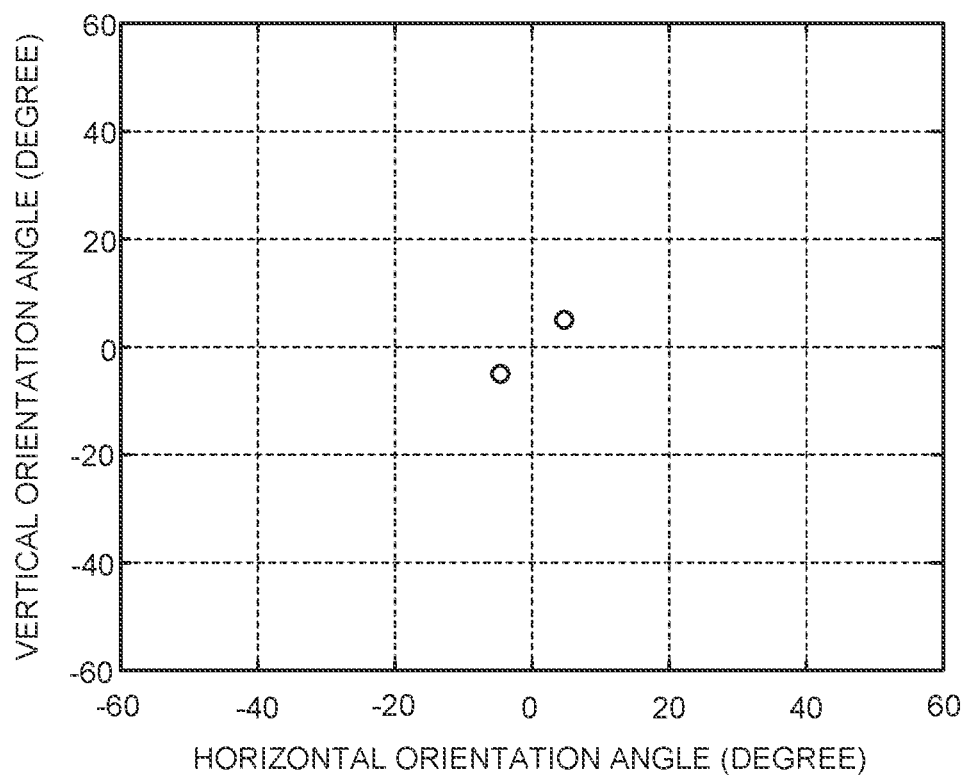
FIG. 22 is a diagram illustrating a simulation result of two-dimensional orientation estimation by a computer.
Figure 23:
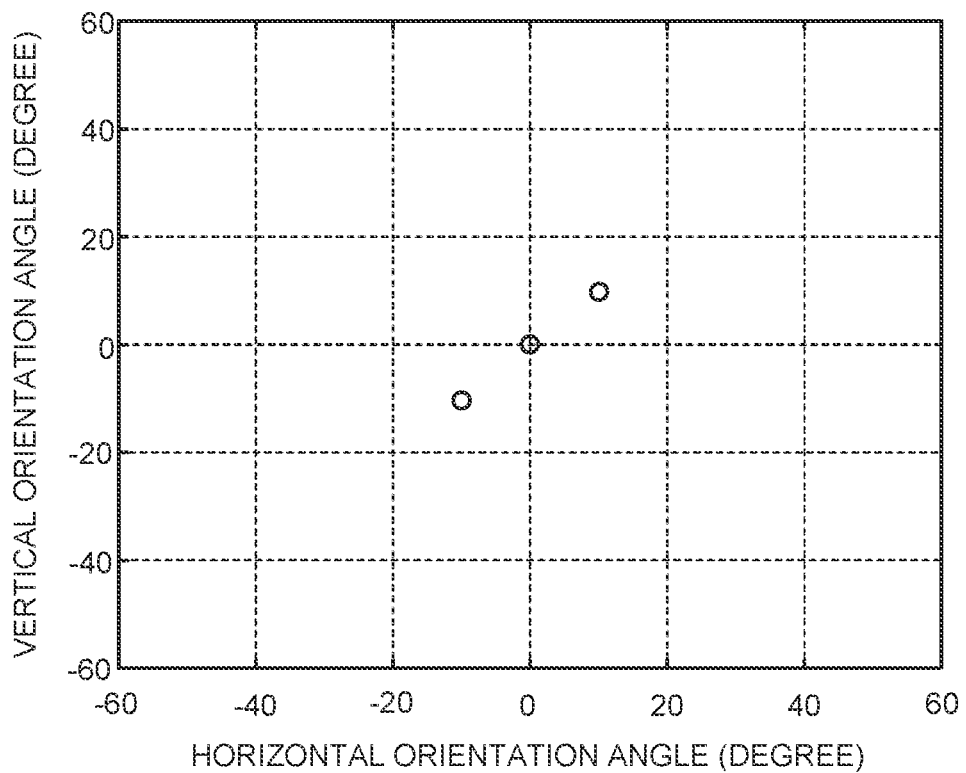
FIG. 23 is a diagram illustrating a simulation result of two-dimensional orientation estimation by a computer.
Figure 24:
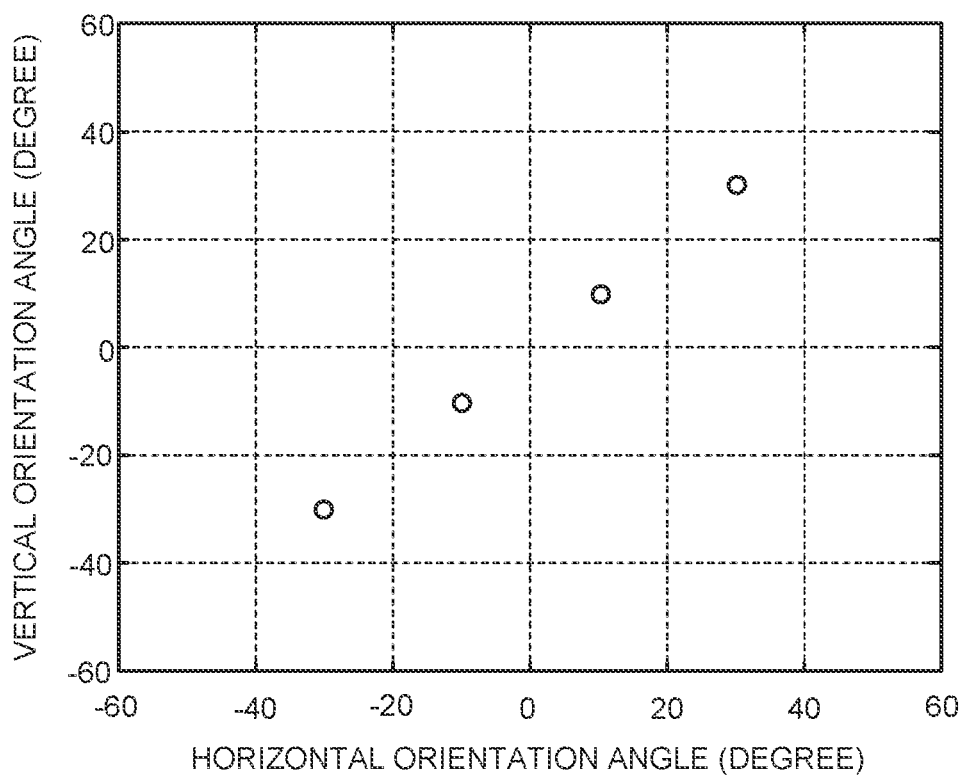
FIG. 24 is a diagram illustrating a simulation result of two-dimensional orientation estimation by a computer.

FIG. 21 illustrates a case where the number of incoming waves is one, and the incoming wave exists in front, that is, the horizontal orientation angle and the vertical orientation angle are at 0 degrees (0, 0). FIG. 22 illustrates a case where the number of incoming waves is two, and the incoming waves exist at (−5, −5) and (+5, +5). FIG. 23 illustrates a case where the number of incoming waves is three, and the incoming waves exist at (−10, −10), (0, 0), and (+10, +10). FIG. 24 illustrates a case where the number of incoming waves is four, and the incoming waves exist at (−30, −30), (−10, −10), (+10, +10), and (+30, +30).

In the incoming wave estimation in FIGS. 21 to 24, knowledge about the number of incoming waves is not given to the computer. The beat signals of the generated incoming waves are completely correlated with each other.

From these drawings, it can be confirmed that the incoming wave estimation by the method of the present embodiment is a method capable of estimating incoming waves of one wave to four waves without knowledge regardless of the number of incoming waves. It can be seen that, even if there is a perfect correlation between incoming waves, the incoming wave estimation can be performed without any problem without depending on the spatial average or the like.

6. MODIFICATION

The above-described embodiment is an example, and various modifications and applications are possible.

In the above-described embodiment, the device that performs the incoming wave estimation method of the present embodiment is the radar device 10, but the device that performs the incoming wave estimation method may not be the radar device. For example, the device that performs the incoming wave estimation method may be a simple processing device that does not have a signal transmission and reception function. At this time, the processing device may be a large-scale integrated circuit (LSI) such as a signal processor.

The device that performs the incoming wave estimation method of the present embodiment may be a communication device having a radar function as an auxiliary function of communication. The device that performs the incoming wave estimation method of the present embodiment may be a vehicle having a radar function as an auxiliary function of driving. These devices can also be regarded as radar devices if they have a radar function.

Furthermore, in the above-described embodiment, both the antenna array 111 (first antenna array) and the antenna array 112 (second antenna array) are arrays arranged at an equal interval in which the plurality of antennas constituting the antenna array are arranged at an equal interval. However, one or both of the antenna array 111 and the antenna array 112 may be an antenna array having antenna intervals that are not equal.

The processing device (control device) that controls the radar device 10 of the present embodiment may be achieved by a dedicated computer system or a general-purpose computer system.

For example, a communication program for executing the above-described operation (for example, transmission/reception processing) is stored and distributed in a computer-readable recording medium such as an optical disk, a semiconductor memory, a magnetic tape, or a flexible disk. Then, for example, the program is installed in a computer, and the above-described processing is executed to configure the control device. At this time, the processing device (control device) may be a device (for example, a personal computer) outside the radar device 10. The processing device (control device) may be a device (for example, the processing unit 13) inside the radar device 10.

The communication program may be stored in a disk device included in a server device on a network such as the Internet so that the communication program can be downloaded to a computer. The above-described functions may be achieved by cooperation of an operating system (OS) and application software. In this case, a portion other than the OS may be stored in a medium and distributed, or a portion other than the OS may be stored in a server device and downloaded to a computer.

Among the processes described in each of the above embodiments, all or part of the processes described as being automatically performed can be manually performed, or all or part of the processes described as being manually performed can be automatically performed by a known method. The processing procedure, specific name, and information including various data and parameters shown in the above document and drawings can be arbitrarily changed unless otherwise specified. For example, the various types of information illustrated in each drawing are not limited to the illustrated information.

Each component of each of the illustrated devices is a functional concept, and does not necessarily have to be physically configured as illustrated in the drawings. That is, the specific form of distribution/integration of each device is not limited to the one illustrated in the drawing, and all or part of the device can be configured by being functionally or physically distributed/integrated in arbitrary units according to various loads and usage conditions.

The above-described embodiment can be appropriately combined as long as the processing contents do not contradict each other. The order of each step illustrated in the flowchart and the sequence diagram of the above-described embodiment can be changed as appropriate.

For example, the present embodiment can be implemented as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of a part of the device).

In the present embodiment, the system means a set of a plurality of components (devices, modules (parts), or the like), and it does not matter whether all the components are in the same housing. Therefore, a plurality of devices housed in separate housings and connected via a network and one device in which a plurality of modules is housed in one housing are both systems.

For example, the present embodiment can adopt a configuration of cloud computing in which one function is shared and processed by a plurality of devices in cooperation via a network.

7. CONCLUSION

According to the estimation of the incoming wave by the calculation method of the present embodiment, there is no problem even if there is a perfect correlation between the incoming waves, which is a problem in the conventional method. Furthermore, it is not necessary to know the number of incoming waves in advance, which has been a major problem in the related art, and this does not cause performance degradation.

In this method, it is not necessary to detect the estimation of the incoming wave direction by the peak search of the orientation spectrum, and two-dimensional position information can be directly obtained from the orientation data in the horizontal direction and the vertical direction. This makes it possible to easily obtain high orientation resolution and target resolution in an extremely small radar.

In the method of the present embodiment, it is not necessary to uniquely fix the arrangement of the horizontal and vertical array antennas in design, and it is possible to flexibly determine the arrangement in cooperation with the antenna and the RF design. This makes it possible to reduce a loss due to a transmission line having a large millimeter wave band.

It is suitable for small radars that obtain higher resolution from fewer antennas.

One object of the present embodiment is to provide two-dimensional incoming wave estimation suitable for a small radar. In this case, it is required to acquire orientation data of the target by extremely lightweight processing using a small array. For this reason, the L-shaped array arrangement is known to be an effective means.

However, the 2-D Unitary Esprit that is conventionally considered to be suitable for two-dimensional array processing cannot support the L-shaped antenna configuration as illustrated in FIGS. 9 and 10 because the center symmetry of the array is a condition in the 2-D Unitary Esprit. Even the 2-D Esprit having a calculation amount larger than that of the 2-D Unitary Esprit but having high versatility cannot support the antenna configuration as illustrated in FIGS. 9 and 10 because the translational symmetry of the array is a condition in the 2-D Esprit.

Although the 1-D Esprit can be used for each array, it is difficult to perform pairing from orientation data obtained by the 1-D Esprit. For example, as in Patent Literature 1, even if the Root-Music and the least squares method are applied to forcibly perform pairing, it is necessary to take an accurate number of incoming waves and a spatial average for each array, and it is assumed that it is difficult to obtain a highly reliable result. This is similar even if the Esprit is used.

In the present embodiment, it is possible to directly obtain the signal value at the reference point for the horizontal and vertical arrays, and pairing can be easily performed using this. According to such processing, pairing can be easily performed even in two arrays arranged at an equal interval existing apart from each other at arbitrary positions on a plane.

Although the embodiments of the present disclosure have been described above, the technical scope of the present disclosure is not limited to the above-described embodiments as it is, and various modifications can be made without departing from the gist of the present disclosure. Components of different embodiments and modifications may be appropriately combined.

The effects in the embodiments described in the present specification are merely examples and are not limited, and there may be other effects.

Note that the present technology can also have the following configurations.

(1)
A radar device comprising:
a first antenna array including a plurality of antennas arranged on a first straight line;
a second antenna array including a plurality of antennas arranged on a second straight line orthogonal to the first straight line; and
a calculation unit that calculates a two-dimensional incoming orientation of one or a plurality of incoming waves based on received values of signals received by the plurality of antennas included in the first antenna array and received values of signals received by the plurality of antennas included in the second antenna array,
wherein a closest distance among distances between the plurality of antennas included in the first antenna array and the plurality of antennas included in the second antenna array is larger than an antenna interval of the first antenna array or the second antenna array.

(2)
The radar device according to (1),
wherein the first antenna array is arranged such that a distance between an intersection of the first straight line and the second straight line and an antenna of the first antenna array closest to the intersection is an integral multiple of an antenna interval of the first antenna array, and
the second antenna array is arranged such that a distance between the intersection and an antenna of the second antenna array closest to the intersection is an integral multiple of an antenna interval of the second antenna array.

(3)
The radar device according to (1),
wherein the first antenna array is arranged such that a distance between an intersection of the first straight line and the second straight line and an antenna of the first antenna array closest to the intersection is an integral multiple or a fractional multiple of an antenna interval of the first antenna array, and
the second antenna array is arranged such that one of the plurality of antennas included in the second antenna array is located at the intersection.

(4)
The radar device according to (1),
wherein the first antenna array is arranged such that a distance between an intersection of the first straight line and the second straight line and an antenna of the first antenna array closest to the intersection is a fractional multiple of an antenna interval of the first antenna array, and
the second antenna array is arranged such that a distance between the intersection and an antenna of the second antenna array closest to the intersection is a fractional multiple of an antenna interval of the second antenna array.

(5)
The radar device according to any one of (1) to (4),
wherein each of the first antenna array and the second antenna array are arrays arranged at an equal interval.

(6)
The radar device according to any one of (1) to (5),
wherein the first antenna array and the second antenna array are arranged to form an L-shape with the first antenna array and the second antenna array.

(7)
The radar device according to (5) or (6),
wherein the number of antennas of at least one of the first antenna array and the second antenna array is eight, and
the calculation unit calculates two-dimensional incoming orientation of at most four incoming waves.

(8)
The radar device according to (5) or (6),
wherein the number of antennas of at least one of the first antenna array and the second antenna array is six, and
the calculation unit calculates a two-dimensional incoming orientation of at most three incoming waves.

(9)
The radar device according to (5) or (6),
wherein the number of antennas of at least one of the first antenna array and the second antenna array is four, and
the calculation unit calculates a two-dimensional incoming orientation of at most two incoming waves.

(10)
The radar device according to (5) or (6),
wherein the first antenna array and the second antenna array are MIMO virtual arrays, and
an array size of the first antenna array and an array size of the second antenna array are any of four arrays, six arrays, and eight arrays.

(11)
The radar device according to (5) or (6),
wherein at least one of the first antenna array and the second antenna array is a sub-array obtained by cutting out array portions arranged at equal intervals from an array having a predetermined size, and
an array size of the sub-array is any of four arrays, six arrays, and eight arrays.

(12)
The radar device according to (11),
wherein the first antenna array is a first sub-array obtained by cutting out array portions arranged at equal intervals from an array having a predetermined size, the first antenna array is a second sub-array obtained by cutting out array portions arranged at equal intervals from an array having a predetermined size, and an array size of the first sub-array and an array size of the second sub-array are any of four arrays, six arrays, and eight arrays.

(13)

The radar device according to any one of (1) to (12), the calculation unit including:

a first signal value calculation unit that calculates a signal value of each of a plurality of incoming waves at a predetermined reference point on a plane in which the first antenna array and the second antenna array are arranged based on a received value of a signal received by the first antenna array;

a second signal value calculation unit that calculates a signal value of each of a plurality of incoming waves at the predetermined reference point based on a received value of a signal received by the second antenna array;

a determination unit that determines a correspondence relationship between the plurality of incoming waves in the first signal value calculation unit and the plurality of incoming waves in the second signal value calculation unit based on the signal value of each of the plurality of incoming waves calculated by the first signal value calculation unit and the signal value of each of the plurality of incoming waves calculated by the second signal value calculation unit; and an orientation calculation unit that calculates a two-dimensional incoming orientation of each of the plurality of incoming waves based on a determination result obtained by the determination unit.

(14)

The radar device according to (13), wherein the first signal value calculation unit calculates the signal value of each of the plurality of incoming waves by solving a first relational expression indicating a relationship between the received value of the plurality of antennas included in the first antenna array and the signal value of an incoming wave based on the received value, and the second signal value calculation unit calculates the signal value of each of the plurality of incoming waves by solving a second relational expression indicating a relationship between the received value of the plurality of antennas included in the first antenna array and the signal value of an incoming wave based on the received value.

(15)

The radar device according to (14), wherein each of the first relational expression and the second relational expression is a closed-form relational expression closed as an explicit function, and the first signal value calculation unit and the second signal value calculation unit each calculate a signal value of each of the plurality of incoming waves only by a flat operation and four arithmetic operations.

(16)

The radar device according to (15), wherein at least one of the first relational expression and the second relational expression is an eight-variable simultaneous equations in eight unknowns, and a signal value of each of the plurality of incoming waves calculated by at least one of the first signal value calculation unit and the second signal value calculation unit is a solution of the simultaneous equations in eight unknowns.

(17)

The radar device according to (15) or (16), wherein at least one of the first relational expression and the second relational expression is a six-variable simultaneous equations in six unknowns, and a signal value of each of the plurality of incoming waves calculated by at least one of the first signal value calculation unit and the second signal value calculation unit is a solution of the simultaneous equations in six unknowns.

(18)

The radar device according to any one of (15) to (17), wherein at least one of the first relational expression and the second relational expression is a four-variable simultaneous equations in four unknowns, and a signal value of each of the plurality of incoming waves calculated by at least one of the first signal value calculation unit and the second signal value calculation unit is a solution of the simultaneous equations in four unknowns.

(19)

The radar device according to any one of (15) to (18), wherein at least one of the first relational expression and the second relational expression is an N-variable simultaneous equations in N unknowns, and a signal value of each of the plurality of incoming waves calculated by at least one of the first signal value calculation unit and the second signal value calculation unit is a solution obtained by excluding an outlier from a solution of the simultaneous equations in N unknowns by a predetermined discriminant.

(20)

A processing device inside or outside an antenna device, the antenna device including a first antenna array including a plurality of antennas arranged on a first straight line, and a second antenna array including a plurality of antennas arranged on a second straight line orthogonal to the first straight line, wherein a closest distance among distances between the plurality of antennas included in the first antenna array and the plurality of antennas included in the second antenna array is larger than an antenna interval of the first antenna array or the second antenna array, the processing device comprising:

a first acquisition unit that acquires received values of signals received by the plurality of antennas of the first antenna array including the plurality of antennas arranged on the first straight line;

a second acquisition unit that acquires received values of signals received by the plurality of antennas of the second antenna array including the plurality of antennas arranged on the second straight line orthogonal to the first straight line; and a calculation unit that calculates a two-dimensional incoming orientation of one or a plurality of incoming waves based on the received values acquired by the first acquisition unit and the received values acquired by the second acquisition unit.

(21)

A calculation method performed by a processing device inside or outside an antenna device, the antenna device including a first antenna array including a plurality of antennas arranged on a first straight line, and a second antenna array including a plurality of antennas arranged on a second straight line orthogonal to the first straight line, wherein a closest distance among distances between the plurality of antennas included in the first antenna array and the plurality of antennas included in the second antenna array is larger than an antenna interval of the first antenna array or the second antenna array, the method comprising:

acquiring received values of signals received by the plurality of antennas included in the first antenna array;

acquiring received values of signals received by the plurality of antennas included in the second antenna array; and calculating a two-dimensional incoming orientation of one or a plurality of incoming waves based on the received values of the signals received by the plurality of antennas included in the first antenna array and the received values of the signals received by the plurality of antennas included in the second antenna array.

(22) A calculation program for a computer inside or outside an antenna device, the antenna device including a first antenna array including a plurality of antennas arranged on a first straight line, and a second antenna array including a plurality of antennas arranged on a second straight line orthogonal to the first straight line, wherein a closest distance among distances between the plurality of antennas included in the first antenna array and the plurality of antennas included in the second antenna array is larger than an antenna interval of the first antenna array or the second antenna array, the program for causing the computer to function as a calculation unit that calculates a two-dimensional incoming orientation of one or a plurality of incoming waves based on received values of signals received by the plurality of antennas included in the first antenna array and received values of signals received by the plurality of antennas included in the second antenna array.

REFERENCE SIGNS LIST

10 RADAR DEVICE
11 RECEPTION ANTENNA UNIT
111 ANTENNA ARRAY
111a to 111d ANTENNA
112 ANTENNA ARRAY
112a to 112d ANTENNA
113 MIXER CIRCUIT
114 AD CONVERTER
115 RANGE FET
116 RANGE SELECTION UNIT
12 TRANSMISSION ANTENNA UNIT
121 TRANSMISSION ANTENNA
122 CHIRP SIGNAL GENERATION UNIT
13 PROCESSING UNIT
131 FIRST ACQUISITION UNIT
132 SECOND ACQUISITION UNIT
133 CALCULATION UNIT
133a FIRST SIGNAL VALUE CALCULATION UNIT
133b SECOND SIGNAL VALUE CALCULATION UNIT
133c DETERMINATION UNIT
133d ORIENTATION CALCULATION UNIT

The invention claimed is:

1. A radar device, comprising:
a first antenna array that includes a first plurality of antennas, wherein
in a plane, an arrangement of the first plurality of antennas is in a first straight line, and
the first plurality of antennas is configured to receive a first plurality of signals;
a second antenna array that includes a second plurality of antennas, wherein
in the plane, an arrangement of the second plurality of antennas is in a second straight line orthogonal to the first straight line, and
the second plurality of antennas is configured to receive a second plurality of signals; and
a central processing unit (CPU) configured to:
solve a first relational expression that indicates a relationship between received values of the first plurality of signals and a first signal value of each incoming wave of a plurality of incoming waves for the first antenna array, based on the received values of the first plurality of signals;
calculate the first signal value of each incoming wave of the plurality of incoming waves at a specific reference point on the plane, based on the solved first relational expression, a flat operation, and four arithmetic operations;
solve a second relational expression that indicates a relationship between received values of the second plurality of signals and a second signal value of each incoming wave of the plurality of incoming waves for the second antenna array, based on the received values of the second plurality of signals, wherein each of the first relational expression and the second relational expression is a closed-form relational expression closed as an explicit function;
calculate the second signal value of each incoming wave of the plurality of incoming waves at the specific reference point, based on the solved second relational expression, the flat operation, and four arithmetic operations;
determine a correspondence relationship between the plurality of incoming waves for the first antenna array and the plurality of incoming waves for the second antenna array, based on the first signal value of each incoming wave of the plurality of incoming waves for the first antenna array and the second signal value of each incoming wave of the plurality of incoming waves for the second antenna array; and
calculate a two-dimensional incoming orientation of each of the plurality of incoming waves based on the determined correspondence relationship, wherein a closest distance among distances between the first plurality of antennas included in the first antenna array and the second plurality of antennas included in the second antenna array is larger than one of an antenna interval of the first antenna array or an antenna interval of the second antenna array.

2. The radar device according to claim 1, wherein
a first distance between an intersection of the first straight line and the second straight line and an antenna of the first antenna array closest to the intersection is an integral multiple of the antenna interval of the first antenna array, and a second distance between the intersection and an antenna of the second antenna array closest to the intersection is an integral multiple of the antenna interval of the second antenna array.

3. The radar device according to claim 1, wherein
a first distance between an intersection of the first straight line and the second straight line and an antenna of the first antenna array closest to the intersection is an integral multiple or a fractional multiple of the antenna interval of the first antenna array, and
one antenna of the second plurality of antennas included in the second antenna array is located at the intersection.

4. The radar device according to claim 1, wherein
a distance between an intersection of the first straight line and the second straight line and an antenna of the first antenna array closest to the intersection is a fractional multiple of the antenna interval of the first antenna array, and
a distance between the intersection and an antenna of the second antenna array closest to the intersection is a fractional multiple of the antenna interval of the second antenna array.

5. The radar device according to claim 1, wherein each of the arrangement of the first antenna array and the arrangement of the second antenna array is at an equal interval.

6. The radar device according to claim 1, wherein
the first antenna array and the second antenna array form an L-shape.

7. The radar device according to claim 5, wherein
a number of antennas of at least one of the first antenna array or the second antenna array is eight, and
the CPU is further configured to calculate the two-dimensional incoming orientation of at most four incoming waves of the plurality of incoming waves.

8. The radar device according to claim 5, wherein
a number of antennas of at least one of the first antenna array and the second antenna array is six, and
the CPU is further configured to calculate two-dimensional incoming orientation of at most three incoming waves of the plurality of incoming waves.

9. The radar device according to claim 5, wherein
a number of antennas of at least one of the first antenna array and the second antenna array is four, and
the CPU is further configured to calculate two-dimensional incoming orientation of at most two incoming waves of the plurality of the incoming waves.

10. The radar device according to claim 5, wherein
the first antenna array and the second antenna array are MIMO virtual arrays,
an array size of the first antenna array is one of four arrays, six arrays, or eight arrays; and
an array size of the second antenna array is one of four arrays, six arrays, or eight arrays.

11. The radar device according to claim 5, wherein
at least one of the first antenna array or the second antenna array is a sub-array based on cut-out of array portions arranged at equal intervals from an array having a specific size, and
an array size of the sub-array is one of four arrays, six arrays, or eight arrays.

12. The radar device according to claim 11, wherein
the first antenna array is a first sub-array based on cut-out of array portions at equal intervals from the array having the specific size,
the second antenna array is a second sub-array based on cut-out of the array portions arranged at equal intervals from the array having the specific size, and
an array size of the first sub-array and an array size of the second sub-array are one of four arrays, six arrays, or eight arrays.

13. The radar device according to claim 1, wherein
at least one of the first relational expression or the second relational expression is an eight-variable simultaneous equations in eight unknowns, and
each of the first signal value of each incoming wave of the plurality of incoming waves and the second signal value of each incoming wave of the plurality of incoming waves is a solution of the simultaneous equations in eight unknowns.

14. The radar device according to claim 1, wherein
at least one of the first relational expression or the second relational expression is a six-variable simultaneous equations in six unknowns, and
each of the first signal value of each incoming wave of the plurality of incoming waves and the second signal value of each incoming wave of the plurality of incoming waves is a solution of the simultaneous equations in six unknowns.

15. The radar device according to claim 1, wherein
at least one of the first relational expression or the second relational expression is a four-variable simultaneous equations in four unknowns, and
each of the first signal value of each incoming wave of the plurality of incoming waves and the second signal value of each incoming wave of the plurality of incoming waves is a solution of the simultaneous equations in four unknowns.

16. The radar device according to claim 1, wherein
at least one of the first relational expression or the second relational expression is an N-variable simultaneous equations in N unknowns, and
each of the first signal value of each incoming wave of the plurality of incoming waves and the second signal value of each incoming wave of the plurality of incoming waves is a solution based on exclusion of an outlier from a solution of the simultaneous equations in N unknowns by a specific discriminant.

17. A processing device, comprising:
a central processing unit (CPU), wherein
the processing device is one of inside or outside an antenna device,
the antenna device includes:
a first antenna array that includes a first plurality of antennas, wherein
in a plane, an arrangement of the first plurality of antennas is in a first straight line, and
the first plurality of antennas is configured to receive a first plurality of signals;
a second antenna array that includes a second plurality of antennas, wherein
the second plurality of antennas is configured to receive a second plurality of signals, and
in the plane, an arrangement of the second plurality of antennas is in a second straight line orthogonal to the first straight line,
a closest distance among distances between the first plurality of antennas included in the first antenna array and the second plurality of antennas included in the second antenna array is larger than one of an antenna interval of the first antenna array or the second antenna array, and the CPU is configured to:
- acquire received values of a first plurality of signals received by the first plurality of antennas of the first antenna array;
- acquire received values of a second plurality of signals received by the second plurality of antennas of the second antenna array;
- solve a first relational expression that indicates a relationship between the received values of the first plurality of signals and a first signal value of each incoming wave of a plurality of incoming waves for the first antenna array, based on the received values of the first plurality of signals;
- calculate the first signal value of each incoming wave of the plurality of incoming waves at a specific reference point on the plane, based on the solved first relational expression, a flat operation, and four arithmetic operations;
- solve a second relational expression that indicates a relationship between the received values of the second plurality of signals and a second signal value of each incoming wave of the plurality of incoming waves for the second antenna array, based on the received values of the second plurality of signals, wherein each of the first relational expression and the second relational expression is a closed-form relational expression closed as an explicit function;
- calculate the second signal value of each incoming wave of the plurality of incoming waves at the specific reference point, based on the solved second relational expression, the flat operation, and four arithmetic operations;
- determine a correspondence relationship between the plurality of incoming waves for the first antenna array and the plurality of incoming waves for the second antenna array, based on the first signal value of each incoming wave of the plurality of incoming waves for the first antenna array and the second signal value of each incoming wave of the plurality of incoming waves for the second antenna array; and
- calculate a two-dimensional incoming orientation of each incoming wave of the plurality of incoming waves based on the determined correspondence relationship.

18. A calculation method, comprising:
in a processing device that is one of inside or outside an antenna device, the antenna device including a first antenna array including a first plurality of antennas in a first straight line, and a second antenna array including a second plurality of antennas in a second straight line orthogonal to the first straight line, wherein a closest distance among distances between the first plurality of antennas included in the first antenna array and the second plurality of antennas included in the second antenna array is larger than an antenna interval of the first antenna array or the second antenna array:
- acquiring received values of a first plurality of signals received by the first plurality of antennas included in the first antenna array;
- acquiring received values of a second plurality of signals received by the second plurality of antennas included in the second antenna array;
- solving a first relational expression that indicates a relationship between the received values of the first plurality of signals and a first signal value of incoming wave of a plurality of incoming waves for the first antenna array, based on the received values of the first plurality of signals;
- calculating the first signal value of incoming wave of the plurality of incoming waves at a specific reference point on a plane, based on the solved first relational expression, a flat operation, and four arithmetic operations;
- solving a second relational expression that indicates a relationship between the received values of the second plurality of signals and a second signal value of each incoming wave of the plurality of incoming waves for the second antenna array, based on the received values of the second plurality of signals, wherein each of the first relational expression and the second relational expression is a closed-form relational expression closed as an explicit function;
- calculating the second signal value of each incoming wave of the plurality of incoming waves at the specific reference point, based on the solved second relational expression, the flat operation, and four arithmetic operations;
- determining a correspondence relationship between the plurality of incoming waves for the first antenna array and the plurality of incoming waves for the second antenna array, based on the first signal value of each incoming wave of the plurality of incoming waves for the first antenna array and the second signal value of each incoming wave of the plurality of incoming waves for the second antenna array; and
- calculating a two-dimensional incoming orientation of each incoming wave of the plurality of incoming waves based on the determined correspondence relationship, wherein a closest distance among distances between the first plurality of antennas included in the first antenna array and the second plurality of antennas included in the second antenna array is larger than one of an antenna interval of the first antenna array or an antenna interval of the second antenna array.

19. A non-transitory computer-readable medium having stored thereon computer-executable instructions, which when executed by a computer that is one of inside of outside an antenna device including a first antenna array and a second antenna array, cause the computer to execute operations, the operations comprising:
- acquiring received values of a first plurality of signals received by a first plurality of antennas included in the first antenna array, wherein the first plurality of antennas is in a first straight line;
- acquiring received values of a second plurality of signals received by a second plurality of antennas included in the second antenna array, wherein the second plurality of antennas is in a second straight line orthogonal to the first straight line, wherein a closest distance among distances between the first plurality of antennas included in the first antenna array and the second plurality of antennas included in the second antenna array is larger than an antenna interval of the first antenna array or the second antenna array;
- solving a first relational expression that indicates a relationship between the received values of the first plurality of signals and a first signal value of each incoming wave of a plurality of incoming waves for the first antenna array, based on the received values of the first plurality of signals;

calculating the first signal value of each incoming wave of the plurality of incoming waves at a specific reference point on a plane, based on the solved first relational expression, a flat operation, and four arithmetic operations;

solving a second relational expression that indicates a relationship between the received values of the second plurality of signals and a second signal value of each incoming wave of the plurality of incoming waves for the second antenna array, based on the received values of the second plurality of signals, wherein each of the first relational expression and the second relational expression is a closed-form relational expression closed as an explicit function;

calculating the second signal value of each incoming wave of the plurality of incoming waves at the specific reference point, based on the solved second relational expression, the flat operation, and four arithmetic operations;

determining a correspondence relationship between the plurality of incoming waves for the first antenna array and the plurality of incoming waves for the second antenna array, based on the first signal value of the plurality of incoming waves for the first antenna array and the second signal value of the plurality of incoming waves for the second antenna array; and calculating a two-dimensional incoming orientation of each incoming wave of the plurality of incoming waves based on the determined correspondence relationship.

\* \* \* \* \*